(12) United States Patent
Hu et al.

(10) Patent No.: US 12,353,043 B2
(45) Date of Patent: Jul. 8, 2025

(54) OPTICAL ELEMENT DRIVING MECHANISM

(71) Applicant: TDK TAIWAN CORP., Taoyuan (TW)

(72) Inventors: Chao-Chang Hu, Taoyuan (TW); Chih-Wei Weng, Taoyuan (TW); Chao-Hsi Wang, Taoyuan (TW); Kuen-Wang Tsai, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 18/654,423

(22) Filed: May 3, 2024

(65) Prior Publication Data

US 2024/0288657 A1 Aug. 29, 2024

Related U.S. Application Data

(63) Continuation of application No. 17/067,030, filed on Oct. 9, 2020, now Pat. No. 12,001,074.

(60) Provisional application No. 62/964,377, filed on Jan. 22, 2020, provisional application No. 62/912,743, filed on Oct. 9, 2019.

(51) Int. Cl.
*G02B 7/00* (2021.01)
*G02B 5/00* (2006.01)

(52) U.S. Cl.
CPC .............. *G02B 7/00* (2013.01); *G02B 5/005* (2013.01)

(58) Field of Classification Search
CPC .................... G02B 7/00; G02B 5/005
See application file for complete search history.

(56) References Cited

U.S. PATENT DOCUMENTS

| 6,102,554 A | 8/2000 | Wynne Willson et al. |
| 7,881,598 B1 | 2/2011 | Wu et al. |
| 8,041,201 B2 * | 10/2011 | Eromaki ............... G02B 7/102 359/554 |
| 2018/0164661 A1 | 6/2018 | Sekimoto et al. |

FOREIGN PATENT DOCUMENTS

| CN | 1909343 A | 2/2007 |
| EP | 0840873 A1 | 5/1998 |
| EP | 3088931 A1 | 11/2016 |
| KR | 100975630 B1 | 8/2010 |
| KR | 20180105970 A | 10/2018 |
| WO | WO-97/05423 | 2/1997 |

OTHER PUBLICATIONS

Extended European Search Report mailed Feb. 26, 2021 in EP Application No. 20200953.6, 9 pages.
EP Office action issued on Apr. 28, 2023 for the corresponding Application No. 20200953.6.

* cited by examiner

*Primary Examiner* — Minh Q Phan
(74) *Attorney, Agent, or Firm* — MUNCY, GEISSLER, OLDS & LOWE, P.C.

(57) ABSTRACT

An optical element driving mechanism has an optical axis, and includes a fixed portion, a movable element, a plurality of blades, and a driving assembly. The fixed portion has an opening. The movable element is movable relative to the fixed portion. The blades are connected to the movable element. The driving assembly drives the movable element to move relative to the fixed portion. The driving assembly drives the movable element to change an overlap area of the blade and the opening.

19 Claims, 19 Drawing Sheets

OPTICAL ELEMENT DRIVING MECHANISM

CROSS REFERENCE TO RELATED APPLICATIONS

The present application is a continuation application of the U.S. patent application Ser. No. 17/067,030, filed on Oct. 9, 2020, which claims priority to U.S. Provisional Patent Application No. 62/912,743, filed on Oct. 9, 2019, and Applications No. 62/964,377, filed on Jan. 22, 2020, which are incorporated by reference herein in their entirety.

BACKGROUND OF THE INVENTION

Field of the Invention

The present invention relates to a driving mechanism, and more particularly to an optical element driving mechanism.

Description of the Related Art

The design of today's electronic devices is continually moving toward miniaturization, so that various elements or structures of optical modules used in such applications as imaging must be continuously reduced in size in order to achieve miniaturization. Therefore, how to design a miniature driving mechanism has become an important issue.

BRIEF SUMMARY OF THE INVENTION

An embodiment of the invention provides an optical element driving mechanism having an optical axis, and includes a fixed portion, a movable element, a plurality of blades, and a driving assembly. The fixed portion has an opening. The movable element is movable relative to the fixed portion. The blades are connected to the movable element. The driving assembly drives the movable element to move relative to the fixed portion. The driving assembly drives the movable element to change an overlap area of the blade and the opening.

According to some embodiments of the present disclosure, the optical element driving mechanism further includes a stopping element, a guiding assembly, a magnetically permeable element, a circuit assembly and a sensing assembly. The stopping element is connected to the fixed portion. The guiding assembly is disposed between the movable element and the fixed portion. The magnetically permeable element is disposed on the fixed portion. The circuit assembly is disposed on the fixed portion. The sensing assembly is disposed on the circuit assembly.

According to some embodiments of the present disclosure, the fixed portion includes an upper cover and a base. The upper cover has an upper surface and an opening, and the upper surface faces an incident light. The base and the upper cover are arranged along a direction that is parallel to the optical axis. The base has an opening, a first concave portion, a second concave portion, a third concave portion, a fourth concave portion, a fifth concave portion, and a sixth concave portion. The first concave portion accommodates the magnetically permeable element, and a depth of the first concave portion is greater than a thickness of the magnetically permeable element. The first concave portion has a bottom surface which is perpendicular to the optical axis and faces the magnetically permeable element. The second concave portion accommodates at least a part of the guiding assembly. The second concave portion has a bottom surface that matches the shape of the guiding assembly. When viewed along a direction that is parallel to the optical axis, the second concave portion is adjacent to the first concave portion, and the second concave portion is farther away from the opening of the base than the first concave portion. When viewed along a direction that is perpendicular to the optical axis, the bottom surface of the second concave portion is closer to the upper surface of the upper cover than the bottom surface of the first concave portion. The third concave portion accommodates at least a part of the circuit assembly. The third concave portion has a bottom surface. When viewed along a direction that is parallel to the optical axis, the third concave portion is adjacent to the first concave portion, and the third concave portion is farther away from the opening of the base than the first concave portion. When viewed along the direction that is perpendicular to the optical axis, the bottom surface of the third concave portion is closer to the upper surface of the upper cover than the bottom surface of the first concave portion. The fourth concave portion accommodates at least a part of the sensing element. The fourth concave portion penetrates through the base. The depth of the fourth concave portion is greater than the thickness of the sensing element. When viewed along the direction that is parallel to the optical axis, the fourth concave portion is adjacent to the first concave portion, and the fourth concave portion is farther away from the opening of the base than the first concave portion. The fifth concave portion accommodates at least a part of the driving assembly, and the fifth concave portion has a bottom surface, wherein when viewed along a direction that is parallel to the optical axis, the fifth concave portion is adjacent to the first concave portion, the second concave portion, and the third concave portion. The fifth concave portion is farther away from the opening of the base than the first concave portion. The distances from the fifth concave portion to the second concave portion and the third concave portion to the opening of the base are approximately the same. When viewed along the direction that is perpendicular to the optical axis, the bottom surface of the fifth concave portion is closer to the upper surface of the upper cover than the bottom surface of the first concave portion and the bottom surface of the third concave portion. The sixth concave portion accommodates at least a part of the stopping element and penetrates through the base. When viewed along the direction that is parallel to the optical axis, the sixth concave portion is adjacent to the fifth concave portion, and the sixth concave portion is farther away from the opening of the base than the first concave portion, the second concave portion, the third concave portion, and the fifth concave portion.

According to some embodiments of the present disclosure, the upper cover further includes a first anti-reflection structure and a second anti-reflection structure. The first anti-reflection structure is disposed on the upper surface and has a first anti-reflection surface. The first anti-reflection surface faces the incident light. The first anti-reflection surface is not parallel to the optical axis, and the first anti-reflection surface is perpendicular to the optical axis. The reflectivity of the first anti-reflection surface is less than a reflectivity of the upper cover. The second anti-reflection structure extends from the upper surface to the opening, forms an angle with the upper surface and surrounds the opening. The second anti-reflection structure is neither parallel nor perpendicular to the optical axis. The second anti-reflection structure has a second anti-reflection surface formed on a surface of the second anti-reflection structure close to the incident light, and a reflectivity of the second anti-reflection surface is less than the reflectivity of the upper cover. The optical element driving mechanism further includes a third anti-reflection structure. The third anti-reflection structure is a plate-shaped structure with an opening corresponding to the incident light. When viewed along the direction that is perpendicular to the optical axis, the third anti-reflection structure is located between the blade and the movable element. When viewed along the direction that is parallel to the optical axis, the third anti-reflection structure at least partially overlaps the blade and the movable element. When viewed along the direction that is parallel to the optical axis, an area of the opening of the upper cover and an area of the opening of the base are different from an area of the opening of the third anti-reflection structure. The area of the opening of the upper cover is greater than the area of the opening of the third anti-reflection structure, and the area of the opening of the base is greater than the area of the opening of the upper cover.

According to some embodiments of the present disclosure, the optical element driving mechanism further includes a plurality of connecting elements, respectively passing through the blades to connect the stopping element to the fixed portion. The movable element has a plurality of tooth portions, a first accommodating portion, a plurality of second accommodating portions, a third accommodating portion, and an opening. The tooth-shaped portions are connected with the blade. The first accommodating portion accommodates a part of the stopping element. The second accommodating portions accommodate a part of the guiding assembly. The third accommodating portion accommodates a part of the driving assembly. The opening receives incident light. The stopping element has a stopping portion, a plurality of holes, protruding portions and openings. The stopping portion is a protruding structure, has a first side wall and a second side wall, is accommodated in the first accommodating portion of the movable element, and restricts the movable element to move within a limiting range relative to the fixed portion. The first side wall and the second side wall are opposite disposed, and the first side wall and the second side wall are parallel to the optical axis. The holes are connected with the connecting element. The protruding portion extends toward the base along the direction that is parallel to the optical axis, and is fixed to the base. The opening receives incident light. Each of the blades has a connection portion and a shielding portion. The connection portion has a hole and a tooth-shaped portion, the connecting element passes through the hole, and the tooth-shaped portion is engaged with the tooth-shaped portion of the movable element. The shielding portion is configured to shield the incident light. The driving assembly drives the movable element to rotate around a first rotating shaft, and the movable element in turn causes the blades to rotate around the connecting elements as the rotating shafts. One of the connecting elements has a second rotating shaft. The second rotating shaft is different from the first rotating shaft. The first rotating shaft is parallel to the optical axis. The second rotating shaft is parallel to the first rotating shaft. The driving assembly includes a magnetic element, the magnetic element includes a plurality of magnetic units, each magnetic unit has an N-pole and an S-pole, and the limiting range does not exceed the length of the magnetic unit.

According to some embodiments of the present disclosure, the movable element has a plurality of first protruding portions, a plurality of second protruding portions, a plurality of third protruding portions, a plurality of first accommodating portions and an opening. The first protruding portions extend toward the upper cover along a direction that is parallel to the optical axis, and pass through the blades and are accommodated in the upper cover. The second protruding portions extend away from the opening along a direction that is perpendicular to the optical axis. Each second protruding portion has a first side and a second side, and the first side and the second side the second side is contactable to the stopping element. The third protruding portions extend toward the base along the direction that is parallel to the optical axis and contact the guiding assembly. Each first accommodating portion is formed between two of the third protruding portions and accommodating a part of the driving assembly. The opening receives incident light. The stopping element has a plurality of stopping portions, a plurality of first protruding portions, a plurality of second protruding portions, a plurality of third protruding portions, and an opening. The stopping portions extend toward the opening along the direction that is perpendicular to the optical axis, and restrict the movable element to move within a limiting range relative to the fixed portion. The second protruding portion of the movable element is disposed between two of the stopping portions. The first protruding portions extend toward the upper cover along the direction that is parallel to the optical axis, pass through the blades and are accommodated in the upper cover. The second protruding portions extend toward the base along a direction that is parallel to the optical axis and are fixed to the base. The third protruding portions extend toward the upper cover along the direction that is parallel to the optical axis, and are fixed to the upper cover. The opening receives incident light. When viewed along a direction that is parallel to the optical axis, the stopping element is farther from the optical axis than the movable element. Each blade has a connection portion and a shielding portion. The connection portion has a hole and an accommodating portion. The first protruding portion of the stopping element passes through the hole and is accommodated in the upper cover, and the first protruding portion of the movable element passes through the accommodating portion and is accommodated in the upper cover. The shielding portion is configured to shield incident light. The driving assembly drives the movable element to rotate around a first rotating shaft, and the movable element in turn causes the blades to rotate around the first protruding portions of the stopping element as the rotating shafts. One of the first protruding portions has a second rotating shaft. The second rotating shaft is different from the first rotating shaft. The first rotating shaft is parallel to the optical axis, and the second rotating shaft is parallel to the first rotating shaft. The driving assembly includes a magnetic element, the magnetic element includes a plurality of magnetic units, each magnetic unit has an N-pole and an S-pole, and the limiting range does not exceed a length of the magnetic unit. The stopping element restricts the movable element to rotate within the limiting range, and the limiting range of rotation of the movable element is at least greater than 30 degrees.

According to some embodiments of the present disclosure, the guiding assembly includes a first intermediate element, a second intermediate element, and a third intermediate element. The first intermediate element, the second intermediate element, and the third intermediate element are movable relative to the fixed portion and the movable element. When viewed along a direction that is parallel to the optical axis, the first intermediate element, the second intermediate element, and the third intermediate element are disposed around the optical axis. When viewed along a direction that is parallel to the optical axis, the optical axis passes through a triangle formed by the first intermediate element, the second intermediate element, and the third intermediate element. The movable element has a first guiding surface, the fixed portion has a second guiding surface, and the first intermediate element directly contacts the first guiding surface and the second guiding surface. An area of the first guiding surface is different from an area of the second guiding surface. The area of the first guiding surface is larger than the area of the second guiding surface.

According to some embodiments of the present disclosure, the driving assembly includes a magnetic element and a driving coil set. The magnetic element may be a ring structure or a plurality of arc structures. The magnetic element includes a plurality of magnetic units. Each magnetic unit has an N-pole and an S-pole. The direction of the magnetic poles of the magnetic unit is parallel to the optical axis, and the magnetic units are disposed along the first imaginary line and form two magnetic pole surfaces, the two magnetic pole surfaces are opposite to each other. The magnetic element is a permanent magnet. The first imaginary line is not parallel to the optical axis. The first imaginary line is perpendicular to the optical axis. The first imaginary line does not intersect the optical axis. An imaginary line is arc-shaped. The driving coil set is disposed on the fixed portion facing one of the magnetic pole surfaces, and includes a plurality of driving coils and a main body portion. The driving coils are embedded in the main body portion. A number of driving coils corresponds to a number of magnetic units, and a winding axis of the driving coil and the light The shaft is parallel to the optical axis, and the winding axis passes through the magnetic element. The four driving coils in the driving coils are the first driving coil, the second driving coil, the third driving coil, and the fourth driving coil. When viewed along the direction that is parallel to the optical axis, the first driving coil and the second driving coil are located on both sides of the optical axis and symmetrical to the optical axis. The shortest distance between the first driving coil and the third driving coil and the shortest distance between the first driving coil and the fourth driving coil are approximately equal.

According to some embodiments of the present disclosure, the circuit assembly is a plate-shaped structure, and includes a first circuit element and a plurality of external connection portions. The first circuit element is electrically connected to the sensing assembly and the driving assembly. The external connections extend along the direction that is perpendicular to the optical axis and are electrically connected with a plurality of external elements. The optical element driving mechanism further includes two other magnetic elements, and the three magnetic elements have an arc structure and are symmetrically disposed on the movable element. The circuit assembly includes a first circuit element and a second circuit element. The first circuit element has a plate-shaped structure. The first circuit element has a plurality of internal connection portions and a main body portion. The internal connection portion is a part exposed by removing part of the main body portion. In a direction that is parallel to the optical axis, a thickness of the internal connection portion is smaller than a thickness of the main body portion. Each internal connection portion is parallel to each other and has two connection portion surfaces. The two connection portion surfaces are opposite to each other, and one of the two connection portion surfaces faces to the incident light, the first circuit element is electrically connected to the sensing assembly and the driving assembly. When viewed along the direction that is perpendicular to the optical axis, the first circuit element is located between the magnetically permeable element and the driving coil set. The second circuit element is disposed on the driving coil set, and includes a plurality of external connection portions and a plurality of internal connection portions. The external connection portions extend from the main body portion of the driving coil assembly to a plurality of directions away from the optical axis. The external connection portions include a first external connection portion, a second external connection portion, a third external connection portion, and a fourth external connection portion. The first external connection portion is not parallel to the second external connection portion, and the third external connection portion is not parallel to the fourth external connection portion. Each external connection portion has two connection portion surfaces. The two connection portion surfaces are opposite to each other. One of the two connection portion surfaces faces in a direction close to the incident light, and the other connection portion surface faces in the direction away from the incident light. The internal connection portions are connected to the first circuit element, and extend from the main body portion to a extending direction that is away from the optical axis, which is a part exposed by removing part of the main body portion of the driving coil assembly. The extending directions of internal connection portions are different from the first external connection portion, the second external connection portion, the third external connection portion, and the fourth external connection portion. Each of the internal connection portions is parallel to each other and has a connection portion surface, the connection portion surface faces the direction away from the incident light.

According to some embodiments of the present disclosure, the sensing assembly includes a sensing magnetic element and a sensing element. The sensing magnetic element is disposed on the movable element. The sensing element is disposed on the fixed portion to sense the magnetic field of the sensing magnetic element to obtain the position of the movable element relative to the fixed portion. The magnetic element is also used as a sensing magnetic element. When viewed along the direction that is parallel to the optical axis, the magnetic element and the sensing element at least partially overlap, and the sensing element does not overlap the first coil, the second coil, the third coil, and the fourth coil, and the sensing element and the magnetically permeable element do not overlap.

BRIEF DESCRIPTION OF THE DRAWINGS

Aspects of this disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
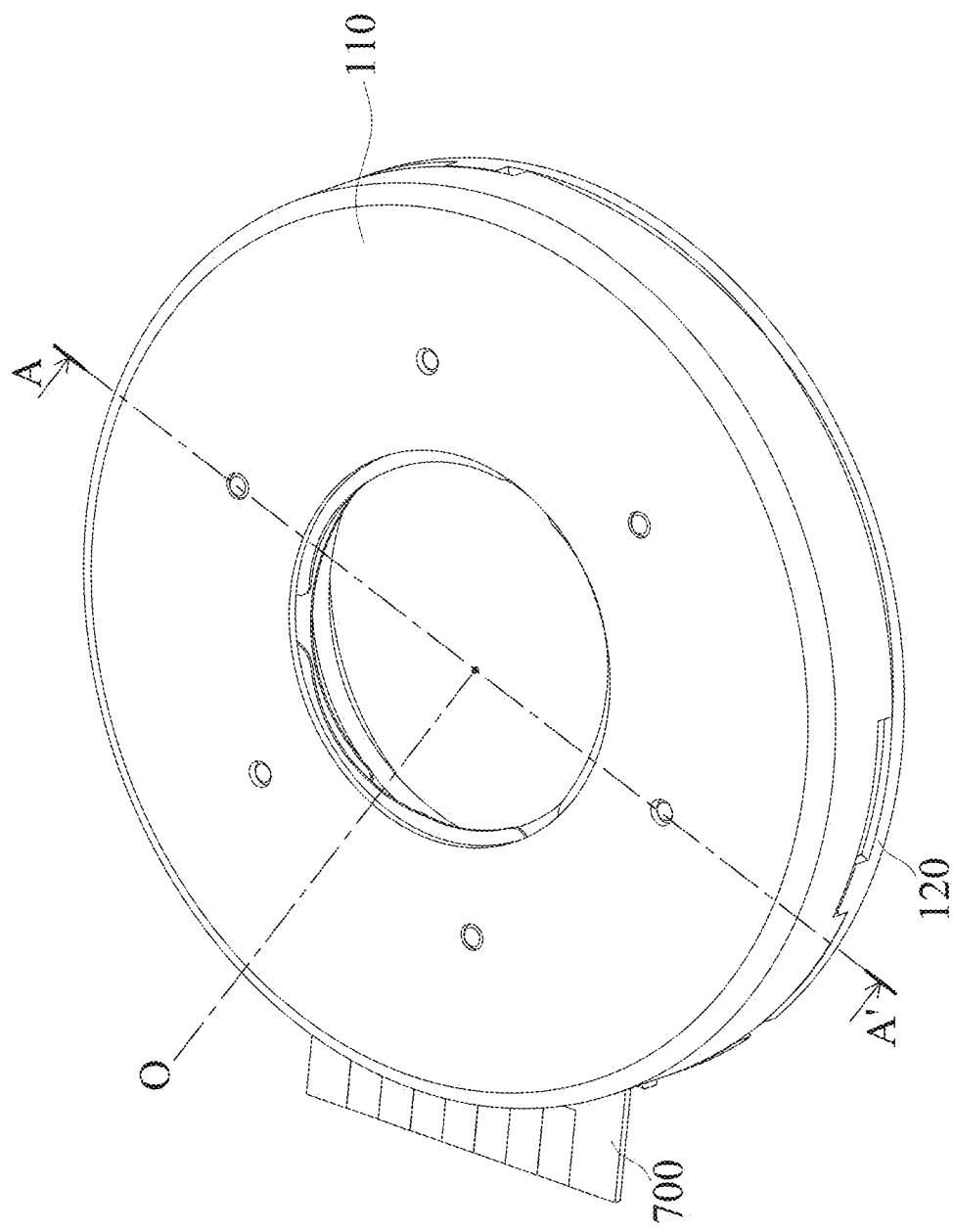
FIG. 1 is a perspective view of an optical element driving mechanism according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
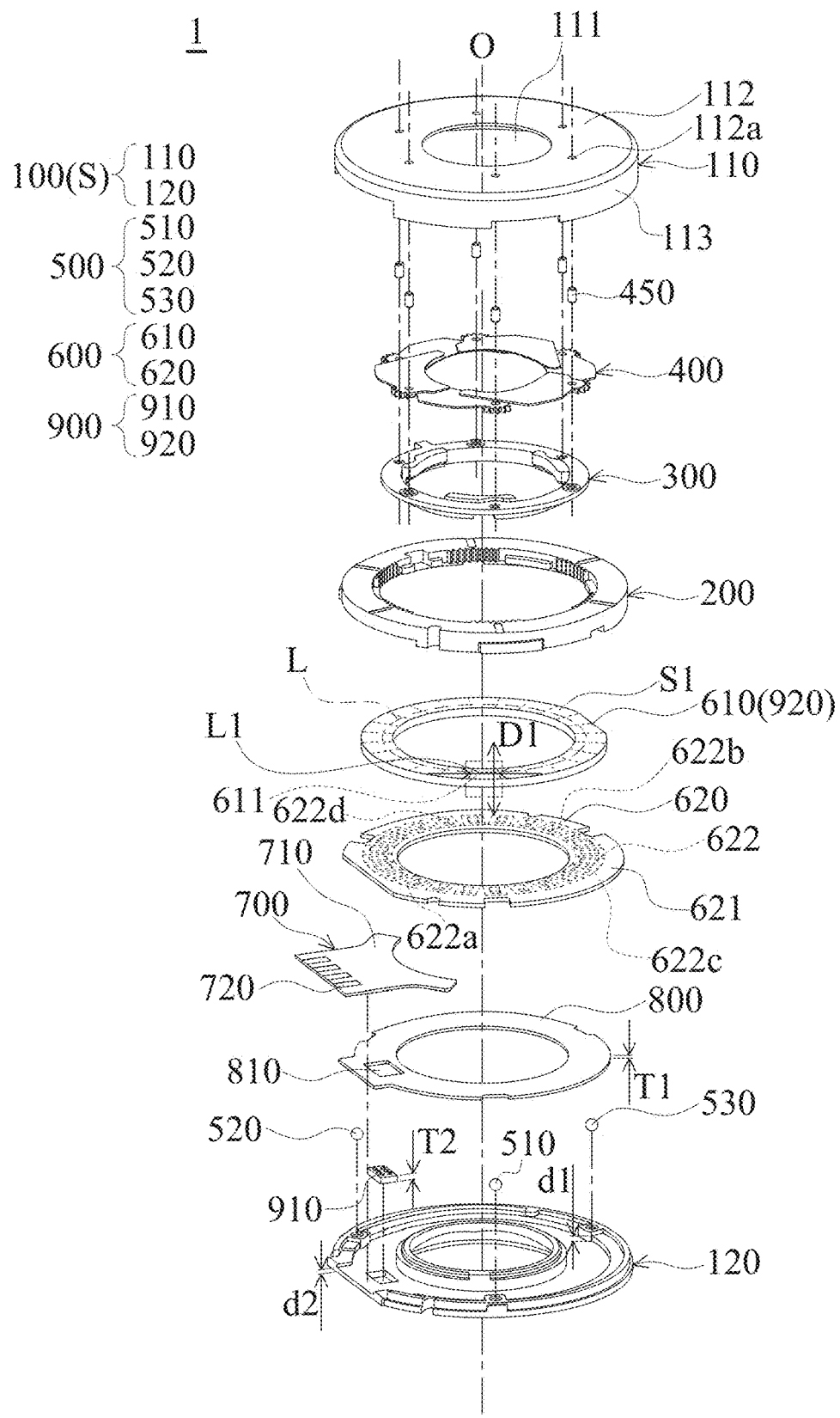
FIG. 2 is an exploded view of an optical element driving mechanism according to an embodiment of the present disclosure.
Figure 3:
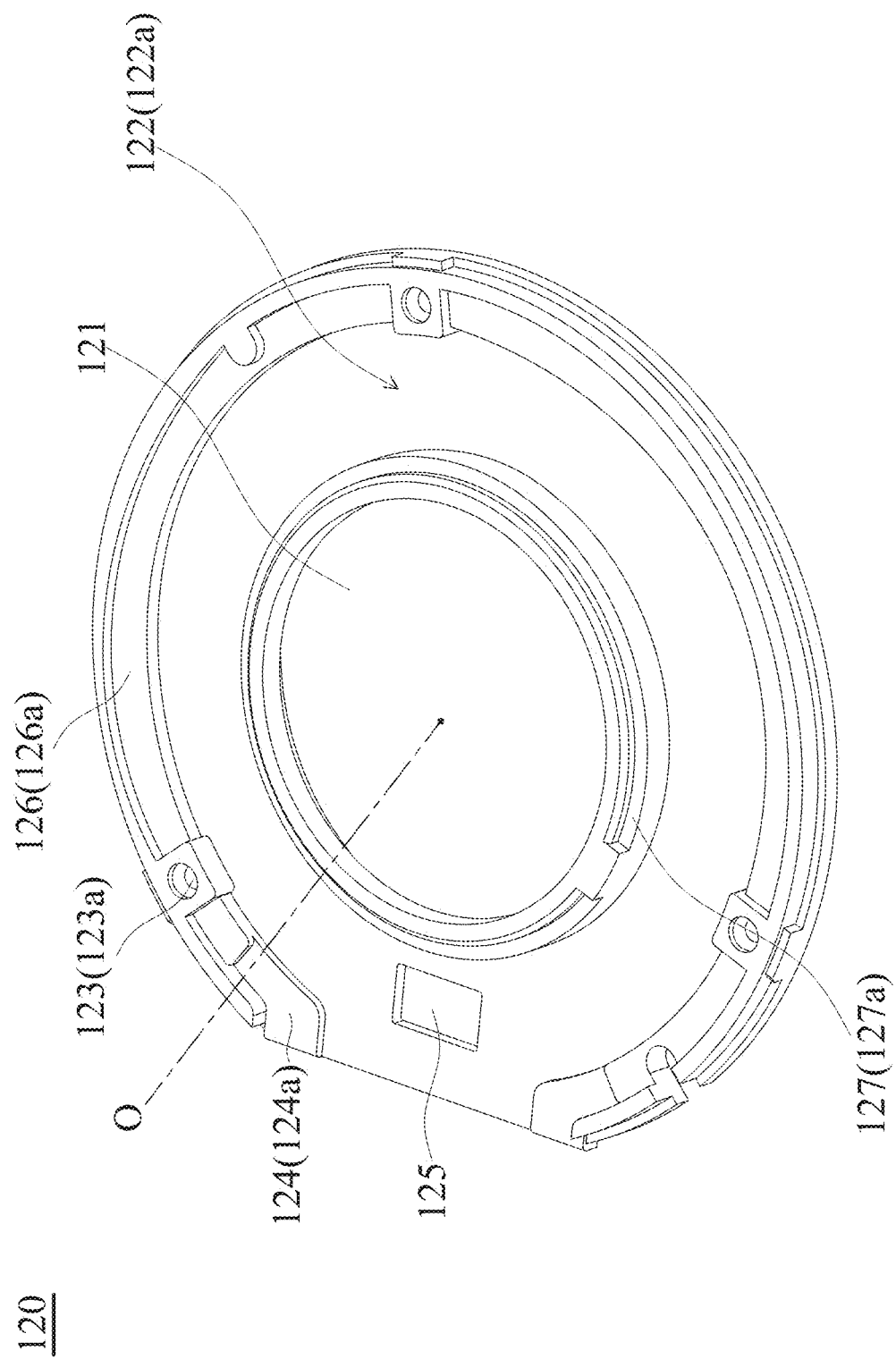
FIG. 3 is a schematic diagram of a partial structure of an optical element driving mechanism according to an embodiment of the present disclosure.

Refer to FIG. 1 to FIG. 3. FIG. 1 is a perspective view of an optical element driving mechanism 1 according to an embodiment of the present disclosure. FIG. 2 is an exploded view of the optical element driving mechanism 1 according to an embodiment of the disclosure. FIG. 3 is a perspective view of a partial structure of the optical element driving mechanism 1 according to an embodiment of the disclosure. The optical element driving mechanism 1 has an optical axis O, and includes a fixed portion 100, a movable element 200, a stopping element 300, a plurality of blades 400, a plurality of connecting elements 450, a guiding assembly 500, a driving assembly 600, a circuit assembly 700, a magnetically permeable element 800, and a sensing assembly 900.

As shown in FIG. 2, the fixed portion 100 includes an upper cover 110 and a base 120. The upper cover 110 has an opening 111, an upper surface 112, and a side surface 113. The opening 111 receives an incident light. The upper surface 112 faces to the incident light, and has a plurality of holes 112a that may be connected to the connecting element 450. The side surface 113 is formed by the upper surface 112 extending toward the base 120 along a direction that is parallel to the optical axis O. The upper cover 110 and the base 120 are arranged along the direction that is parallel to the optical axis O. The upper cover 110 is closer to the incident light than the base 120. By combining the upper cover 110 and the base 120, a housing S of the optical element driving mechanism 1 may be formed to protect various elements inside the optical element driving mechanism 1.

As shown in FIGS. 2 and 3, the base 120 has an opening 121, a first concave portion 122, a second concave portion 123, a third concave portion 124, a fourth concave portion 125, a fifth concave portion 126, and a sixth concave portion 127. The first concave portion 122 accommodates the magnetically permeable element 800, and a depth d1 of the first concave portion 122 is greater than a thickness T1 of the magnetically permeable element 800. The first concave portion 122 has a bottom surface 122a that is perpendicular to the optical axis O and faces the magnetically permeable element 800.

The second concave portion 123 accommodates at least a part of the guiding assembly 500. The second concave portion 123 has a bottom surface 123a, and the bottom surface 123a matches a shape of the guiding assembly 500. When viewed along the direction that is parallel to the optical axis O, the second concave portion 123 is adjacent to the first concave portion 122, and the second concave portion 123 is farther away from the opening 121 of the base 120 than the first concave portion 122. When viewed along a direction that is perpendicular to the optical axis O, the bottom surface 123a of the second concave portion 123 is closer to the upper surface 112 of the upper cover 110 than the bottom surface 122a of the first concave portion 122.

The third concave portion 124 accommodates at least a part of the circuit assembly 700. The third concave portion 124 has a bottom surface 124a. When viewed along a direction that is parallel to the optical axis O, the third concave portion 124 is adjacent to the first concave portion 122, and the third concave portion 124 is farther from the opening 121 of the base 120 than the first concave portion 122. When viewed along the direction that is perpendicular to the optical axis O, the bottom surface 124a of the third concave portion 124 is closer to the upper surface 112 of the upper cover 110 than the bottom surface 122a of the first concave portion 122. By providing the first concave portion 122 and the third concave portion 124 to respectively accommodate the magnetically permeable element 800 and a part of the circuit assembly 700, the distance between the magnetically permeable element 800 and the circuit assembly 700 is close to zero, thereby achieving the miniaturization of the optical element driving mechanism 1.

The fourth concave portion 125 accommodates at least a part of the sensing assembly 900, and a depth d2 of the fourth concave portion 125 is greater than a thickness T2 of the part of the sensing assembly 900 to prevent the sensing assembly 900 from being impacted by other elements. The fourth concave portion 125 penetrates through the base 120. When viewed along a direction that is parallel to the optical axis O, the fourth concave portion 125 is adjacent to the first concave portion 122, and the fourth concave portion 125 is farther from the opening 121 of the base 120 than the first concave portion 122.

The fifth concave portion 126 accommodates at least a part of the driving assembly 600. The fifth concave portion 126 has a bottom surface 126a. When viewed along the direction that is parallel to the optical axis O, the fifth concave portion 126 is adjacent to the first concave portion 122, the second concave portion 123, and the third concave portion 124, and the fifth concave portion 126 is farther from the opening 121 of the base 120 than the first concave portion 122. The distance from the fifth concave portion 126 to the opening 121 of the base 120 is approximately the same as the distance from the second concave portion 123 to the opening 121 of the base 120 and the distance from the third concave portion 124 to the opening 121 of the base 120. When viewed along the direction that is perpendicular to the optical axis O, the bottom surface 126a of the fifth concave portion 126 is closer to the upper surface 112 of the upper cover 110 than the bottom surface 122a of the first concave portion 122 and the bottom surface 124a of the third concave portion 124. By providing the first concave portion 122 and the fifth concave portion 126 to respectively accommodate the magnetically permeable element 800 and the driving assembly 600, the distance between the bottom surface 126a of the fifth concave portion 126 and the bottom surface 122a of the first concave portioned portion 122 is greater than the thickness of the magnetically permeable element 800, so that there is a non-zero gap between the magnetically permeable element 800 and the driving assembly 600, and a part of the circuit assembly 700 may be accommodated as described above, so as to achieve the miniaturization of the optical element drive mechanism 1, and the distance between the magnetically permeable element 800 and the driving assembly 600 is still enough to make the magnetically permeable element 800 affect the driving assembly 600.

The sixth concave portion 127 accommodates at least a part of the stopping element 300. The sixth concave portion 127 has a bottom surface 127a. When viewed along a direction that is parallel to the optical axis O, the sixth concave portion 127 is adjacent to the first concave portion 122, and the sixth concave portion 127 is closer to the opening 121 of the base 120 than the first concave portion 122, the second concave portion 123, the third concave portion 124, and the fourth concave portion 125, and the fifth concave portion 126. When viewed along the direction that is perpendicular to the optical axis O, the bottom surface 127a of the sixth concave portion 127 is closer to the upper surface 112 of the upper cover 110 than the bottom surface 122a of the first concave portion 122.

A bonding element (not shown) may be disposed between the base 120 and each element. The bonding element directly contacts the base 120, the magnetically permeable element 800, the driving assembly 600, the circuit assembly 700, and the stopping element 300, so that the magnetically permeable element 800, the driving assembly 600, the circuit assembly 700, and the stopping element 300 are fixed to the base 120.

Figure 4:
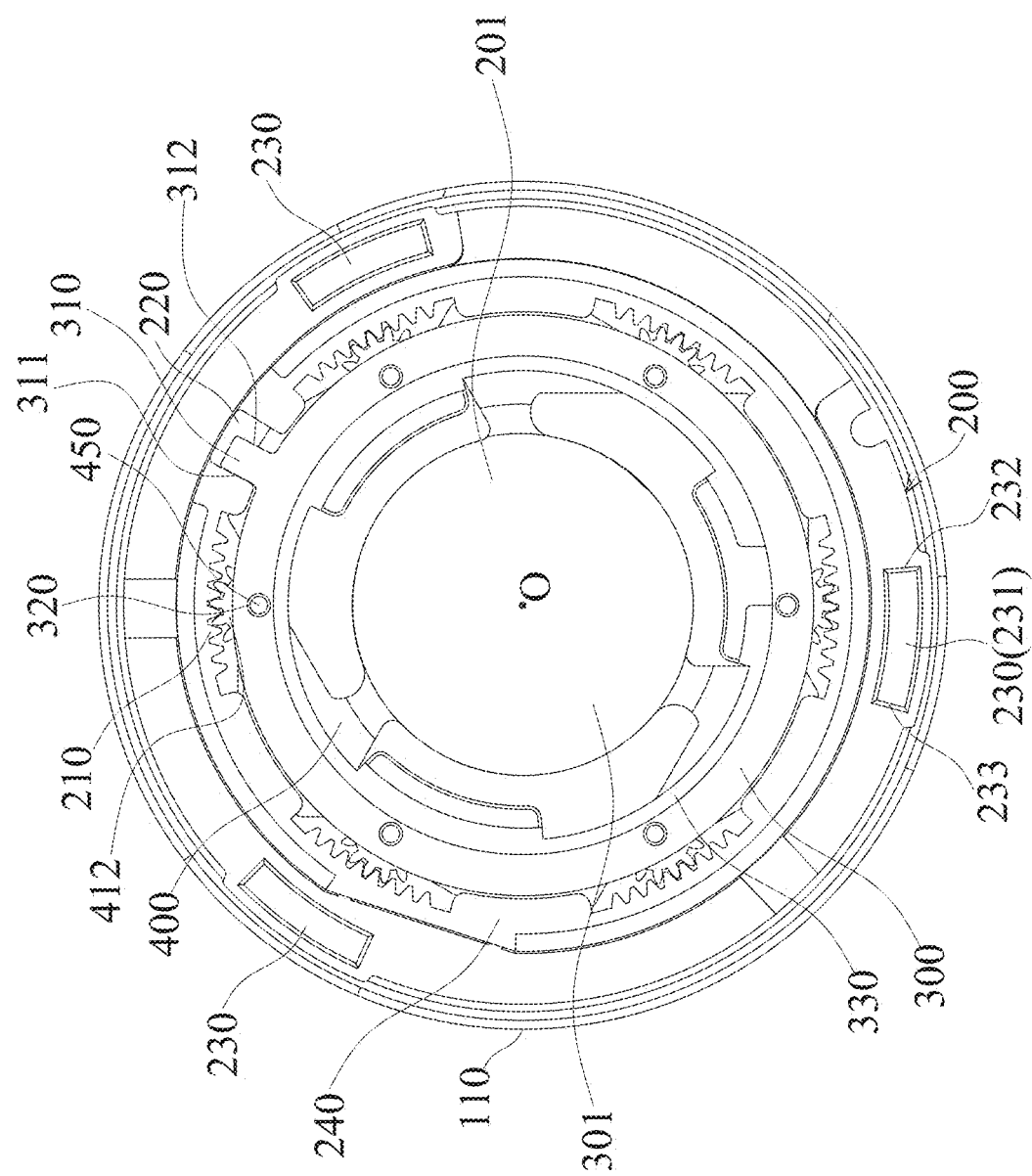
FIG. 4 is a bottom view of a partial structure of an optical element driving mechanism according to an embodiment of the present disclosure.

Refer to FIGS. 2 and 4. FIG. 4 is a bottom view of a partial structure of the optical element driving mechanism 1 according to an embodiment of the present disclosure. The movable element 200 has a plurality of tooth-shaped portions 210, a first accommodating portion 220, a plurality of second accommodating portions 230, a third accommodating portion 240, and an opening 201. The tooth-shaped portion 210 is connected to the blade 400, the first accommodating portion 220 accommodates a part of the stopping element 300, the second accommodating portion 230 accommodates a portion of the guiding assembly 500, and the third accommodating portion 240 accommodates a part of the driving assembly 600. The opening 201 receives incident light.

The stopping element 300 has a stopping portion 310, a plurality of holes 320, a protruding portion 330, and an opening 301. The stopping portion 310 is a protruding structure and may be accommodated in the first accommodating portion 220 of the movable element 200, and restricts the movable element 200 to move within a limiting range relative to the fixed portion 100. More specifically, the stopping portion 310 has a first side wall 311 and a second side wall 312, and the first side wall 311 and the second side wall 312 are disposed opposite each other. The first side wall 311 and the second side wall 312 are parallel to the optical axis O. When the movable element 200 contacts the first side wall 311 or the second side wall 312 of the stopping portion 300, the movable element 200 stops moving. A plurality of holes 320 are connected to the connecting elements 450, and the stopping element 300 may be fixed to the upper cover 110 by the connecting element 450. The protruding portion 330 extends toward the base 120 along a direction that is parallel to the optical axis O, and may be fixed to the sixth concave portion 127 of the base 120 by the bonding element.

Figure 5:
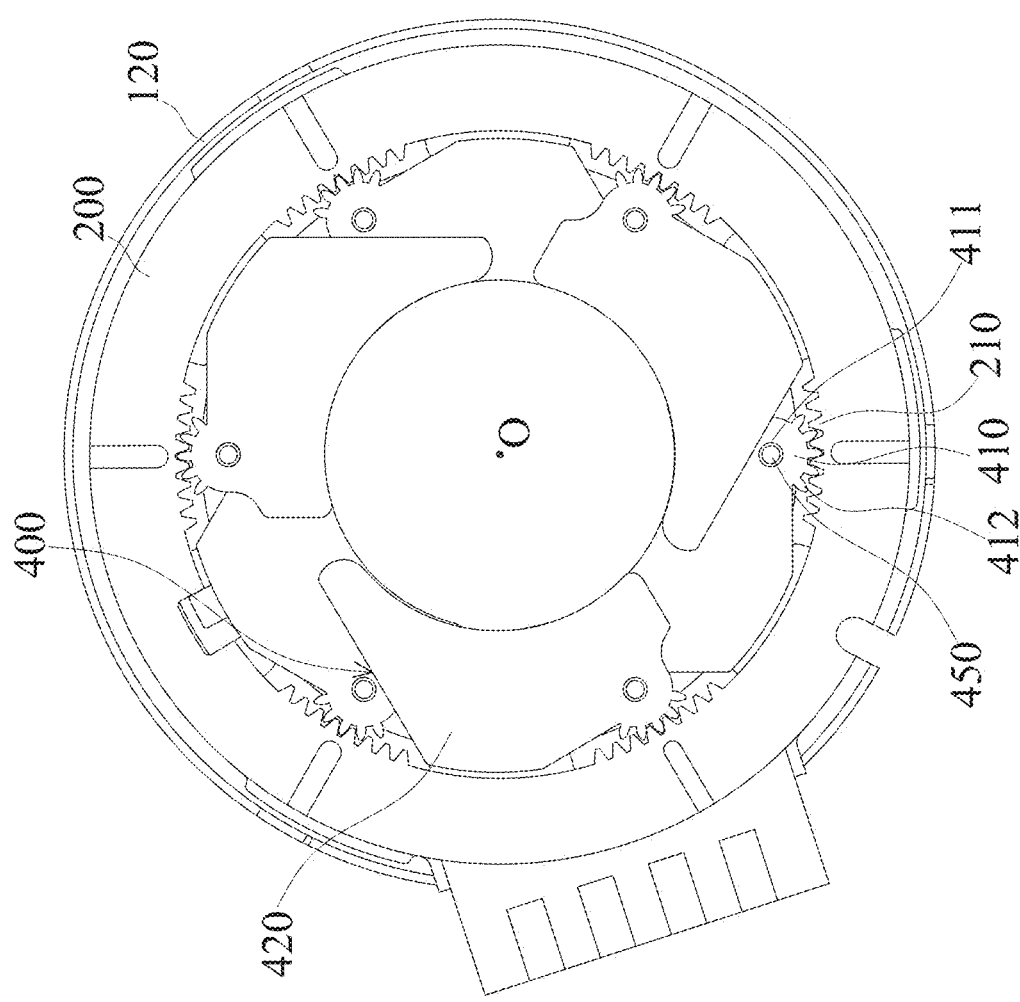
FIG. 5 is a top view of a partial structure of an optical element driving mechanism according to an embodiment of the present disclosure.

Refer to FIG. 2 and FIG. 5. FIG. 5 is a top view of a partial structure of the optical element driving mechanism 1 according to an embodiment of the present disclosure. In this embodiment, there are six blades 400, each blade 400 has a connection portion 410 and a shielding portion 420, and the connection portion 410 has a hole 411 and a tooth-shaped portion 412. The hole 411, the hole 112 of the upper cover 110, and the hole 320 of the stopping element 300 are aligned, and the connecting element 450 passes through the hole 411 of the blade 400 to connect to the upper cover 110 and the stopping element 300. The tooth-shaped portion 412 of the blade 400 and the tooth-shaped portion 210 of the movable element 200 are mutually engaged. The shielding portion 420 is configured to shield the incident light.

When the driving assembly 600 drives the movable element 200 to move relative to the fixed portion 100, the movable element 200 rotates around a first rotating shaft. In this embodiment, the first rotating shaft is the optical axis. The movement of the movable element 200 further causes the blade 400 to move. More specifically, when the movable element 200 rotates around the first rotating shaft, the tooth-shaped portion 412 and the tooth-shaped portion 210 are engaged with each other, so that the six blades 400 may be rotated around the connecting elements 450 (which may be regarded as the second rotating shaft to the seventh rotating shaft) as the rotating shafts. Therefore, when viewed along the direction that is parallel to the optical axis O, an overlapping area of the shielding portion 420 and the opening 111 may be changed. The first rotating shaft is different from the second rotating shaft to the seventh rotating shaft, and the first rotating shaft is parallel to the second rotating shaft to the seventh rotating shaft. Although the number of blades 400 in this embodiment is six and six blades 400 are disposed symmetrically, the number and configuration of blades 400 are not limited to this, and can be changed according to requirements.

Figure 6:
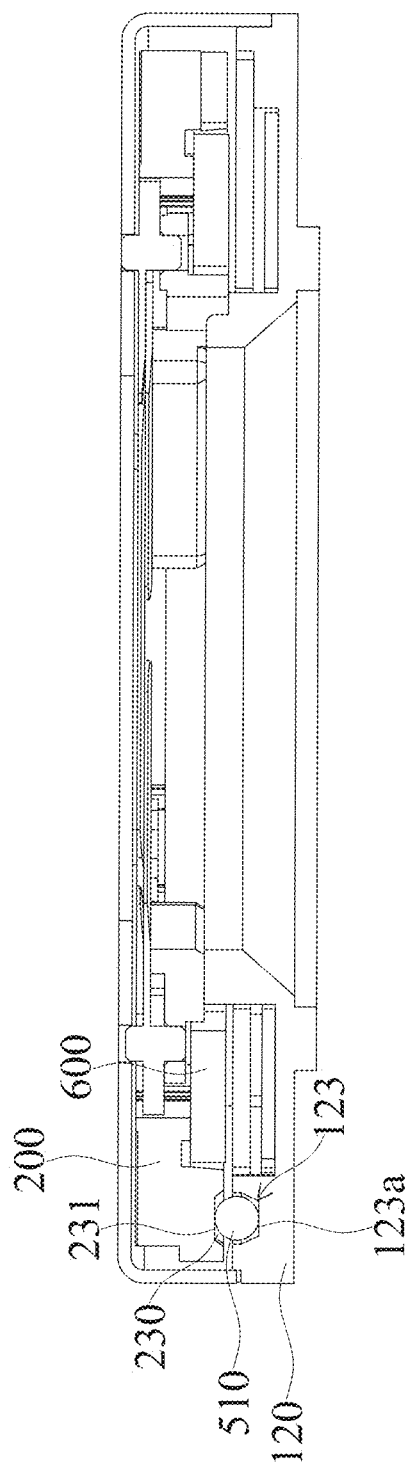
FIG. 6 is a cross-sectional view of the optical element driving mechanism taken along line A-A' in FIG. 1.

Refer to FIGS. 2 to 4, and FIG. 6. FIG. 6 is a cross-sectional view of the optical element driving mechanism 1 along the line A-A' of FIG. 1. The guiding assembly 500 includes a first intermediate element 510, a second intermediate element 520, and a third intermediate element 530, which are spherical. The first intermediate element 510, the second intermediate element 520, and the third intermediate element 530 may be moved relative to the fixed portion 100 or the movable element 200. When viewed along a direction that is parallel to the optical axis O, the first intermediate element 510, the second intermediate element 520, and the third intermediate element 530 are disposed around the optical axis O. When viewed along a direction that is parallel to the optical axis O, the optical axis O passes through a triangle formed by the first intermediate element 510, the second intermediate element 520, and the third intermediate element 530. Although the guiding assembly 500 has three intermediary elements in this embodiment, the number and shape of the intermediary elements are not limited to this, and can be changed as required.

The guiding assembly 500 is movably disposed between the fixed portion 100 and the movable element 200, which may reduce the friction between the fixed portion 100 and the movable element 200. When viewed along the direction that is perpendicular to the optical axis O, the driving assembly 600 and the guiding assembly 500 at least partially overlap. When viewed along the direction that is parallel to the optical axis O, the driving assembly 600 and the guiding assembly 500 do not overlap. More specifically, the guiding assembly 500 is movably disposed between the second concave portion 123 of the base 120 and the second accommodating portion 230 of the movable element 200. The following uses the first intermediate element 510 to illustrate the relationship between the guiding assembly 500 and the fixed portion 100 and the movable element 200. The second intermediate element 520 and the third intermediate element 530 are similar to the first intermediate element 510 and are not described in detail here. The second accommodating portion 230 and the second concave portion 123 restrict the range of movement of the first intermediate element 510. The second accommodating portion 231 has a first guiding surface 231. The bottom surface 123a of the second concave portion 123 may be regarded as a second guiding surface 123a. The first intermediate element 510 directly contacts the first guiding surface 231 and the second guiding surface 123a, and the first intermediate element 510 may move relative to the first guiding surface 231 and the second guiding surface 123a. An area of the first guiding surface 231 is different from an area of the second guiding surface 123a, and in this embodiment, the area of the first guiding surface 231 is larger than the area of the second guiding surface 123a.

More specifically, as shown in FIG. 3, when viewed along the direction that is parallel to the optical axis O, the second concave portion 123 of the base 120 has a shape that just accommodates the first intermediate element 510, and as shown in FIG. 4, the second accommodating portion 230 of the movable element 200 has a first wall 232 and a second wall 233, and has a shape larger than that of the first intermediate element 510. When the driving assembly 600 drives the movable element 200 to move, the first intermediate element 510 may be rotated in the same location of the second concave portion 123 relative to the fixed portion 100, and the first intermediate element 510 may be rotated from the first wall 232 of the second accommodating portion 230 to the second wall 233 of the second accommodating portion 230 relative to the movable portion 200.

However, the configuration of the guiding assembly 500, the movable element 200 and the fixed portion 100 is not limited to this, and may be changed according to requirements. For example, the first intermediate element 510 may also be fixed to the second concave portion 123. In some embodiments, the area of the first guiding surface 231 is smaller than the area of the second guiding surface 123a. A suitable material may be disposed between the movable element 200 and the fixed portion 100 rather than the first intermediate element 510 to reduce the friction between the movable element 200 and the fixed portion 100.

Back to FIG. 2 and FIG. 4. The driving assembly 600 includes a magnetic element 610 and a driving coil set 620. The magnetic element 610 is disposed in the third accommodating portion 240 of the movable element 200 and may be fixed to the movable element 200 by the bonding element. The magnetic element 610 includes a plurality of magnetic units 611, each magnetic unit 611 (as indicated by the dashed line in FIG. 2) has an N-pole and an S-pole, and the magnetic pole direction of the magnetic unit 611 is parallel to the optical axis O. The magnetic units 611 are arranged along a first imaginary line L and formed two magnetic pole surfaces S1. Two magnetic pole surfaces S1 are opposite each other, and one of the magnetic pole surfaces S1 faces the driving coil set 620. The first imaginary line L is not parallel to the optical axis O. More specifically, the first imaginary line L is arc-shaped and perpendicular to the optical axis O, and the first imaginary line L does not intersect the optical axis O. In this embodiment, the magnetic unit 611 may be a permanent magnet.

The driving coil set 620 is fixed to the fixed portion 100. More specifically, the driving coil set 620 is disposed in the fifth concave portion 126 of the base 120. The driving coil assembly 620 includes a main body 621 and a plurality of driving coils 622. The plurality of driving coils 622 are embedded in the main body 621. The number of the driving coils 622 corresponds to the number of the magnetic units 611, and the winding axis of the driving coil 621 is parallel to the optical axis O, and the winding axis passes through the magnetic element 610. In this embodiment, four of the driving coils 622 are a first driving coil 622a, a second driving coil 622b, a third driving coil 622c, and a fourth driving coil 622d. When viewed along a direction that is parallel to the optical axis O, the first driving coil 622a and the second driving coil 622b are located on both sides of the optical axis O and symmetrical to the optical axis O, and the shortest distance between the first driving coil 622a and the third driving coil 622c is approximately equal to the shortest distance between the first driving coil 622a and the fourth driving coil 622d.

Although a ring-shaped magnetic element 610 and a ring-shaped driving coil set 620 are shown in this embodiment, it is not limited to this and can be changed as required. For example, in some embodiments, two arc-shaped magnetic elements are disposed symmetrically to the optical axis O, and the driving coil set only has the first driving coil 622a and the second driving coil 622b as described above. Or in some other embodiments, three arc-shaped magnetic elements are disposed around the optical axis, and the driving coil set only has the first driving coil 622a, the third driving coil 622c, and the fourth driving coil 622d as described above.

The circuit assembly 700 is disposed between the magnetically permeable element 800 and the driving coil assembly 620, and may be connected to the driving coil assembly 620 by the bonding element. The circuit assembly 700 has a plate-shaped structure, and includes a first circuit element 710 and a plurality of external connection portions 720. The first circuit element 710 is electrically connected to the sensing assembly 900 and the driving assembly 600. The external connection portion 720 extends along the direction that is perpendicular to the optical axis O, and may be electrically connected to external elements.

However, the configuration of the circuit assembly 700 is not limited to this. For example, in some embodiments, the circuit assembly 700 may be partially disposed in the driving coil set 620, which will be described in detail in the following embodiments.

The magnetic permeable element 800 is a plate-shaped structure and is disposed in the first concave portion 122 of the base 120. The magnetic permeable element 800 has an accommodating portion 810 for accommodating a part of the sensing assembly 900, and the accommodating portion 810 passes through the magnetically permeable element 800 along the direction that is parallel to the optical axis O. The magnetically permeable element 800 corresponds to the magnetic element 610 to adjust the distribution of the magnetic force of the magnetic element 610, thereby increasing the driving force of the driving assembly 600.

The sensing assembly 900 is used to sense a relative movement between the fixed portion 100 and the movable element 200. At least a part of the sensing assembly 900 is disposed on the movable element 200, and at least another part of the sensing assembly 900 is disposed on the fixed portion 100. For example, the sensing assembly 900 may include a sensing element 910 and a sensing magnetic element 920. The sensing element 910 is disposed on the base 120 of the fixed portion 100, and the sensing magnetic element 920 is disposed on the movable element 200. More specifically, the sensing element 910 may be, for example, a Hall effect sensor, a MR sensor, a tunnel magnetoresistance effect sensor, or a fluxgate, etc., is disposed to sense the magnetic field of the sensing magnetic element 920 on the movable element 200 to obtain the position of the movable element 200 relative to the base 120, but it is not limited to this. For example, in this embodiment, the magnetic element 610 may be used as the sensing magnetic element 920 at the same time. When viewed along the direction that is parallel to the optical axis O, the magnetic element 610 and the sensing element 910 at least partially overlap. When viewed along the direction that is parallel to the optical axis O, the sensing element 910 and the first driving coil 622a, the second driving coil 622b, the third driving coil 622c, and the fourth driving coils 622d do not overlap. When viewed along the direction that is parallel to the optical axis O, the sensing element 910 and the magnetically permeable element 800 do not overlap.

The optical element driving mechanism 1 applied to the adjustment of the aperture is described as follows. The movable element 200 is located at an initial position. When viewed along the direction that is parallel to the optical axis O, the sensing element 910 overlaps a boundary of the two magnetic units 611. The sensing assembly 900 outputs a signal to the circuit assembly 700 corresponding to the target value of the aperture, and the circuit assembly 700 outputs a current to the driving coil set 620, so that an electromagnetic force is generated between the driving coil set 620 and the magnetic element 610. The magnetic element 610 is driven by the electromagnetic force, so that the movable element 200 is rotated around the optical axis O relative to the fixed portion 100. When the movable element 200 rotates, each blade 400 are rotated around the connecting elements 450 as the rotating shafts, so that the shielding portion 420 shields the opening 111 to achieve the target value of the aperture.

As described above, the movable element 200 may be controlled to rotate within a control range relative to the fixed portion 100 by the signal, and the stopping element 300 is used to restrict the movable element 200 rotating within the limiting range. In this embodiment, the limiting range of the rotation of the movable element 200 is smaller than the length L1 of the magnetic unit 611. That is, the limiting range of the movement of the movable element 200 does not exceed one of the magnetic poles of the magnetic unit 611. The limiting range is greater than the control range, that is, a rotatable angle of the limiting range is greater than a rotatable angle of the control range.

Figure 7:
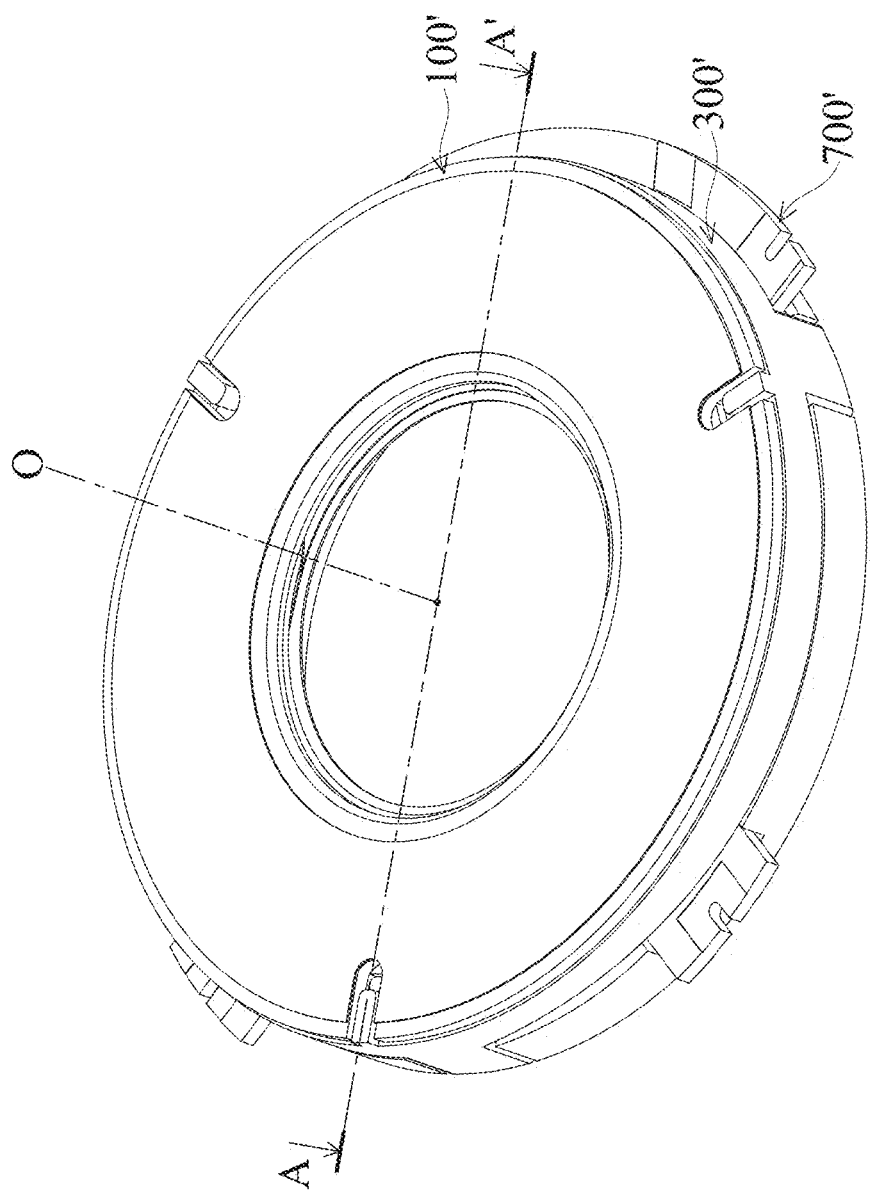
FIG. 7 is a perspective view of an optical element driving mechanism according to an embodiment of the present disclosure.
Figure 8:
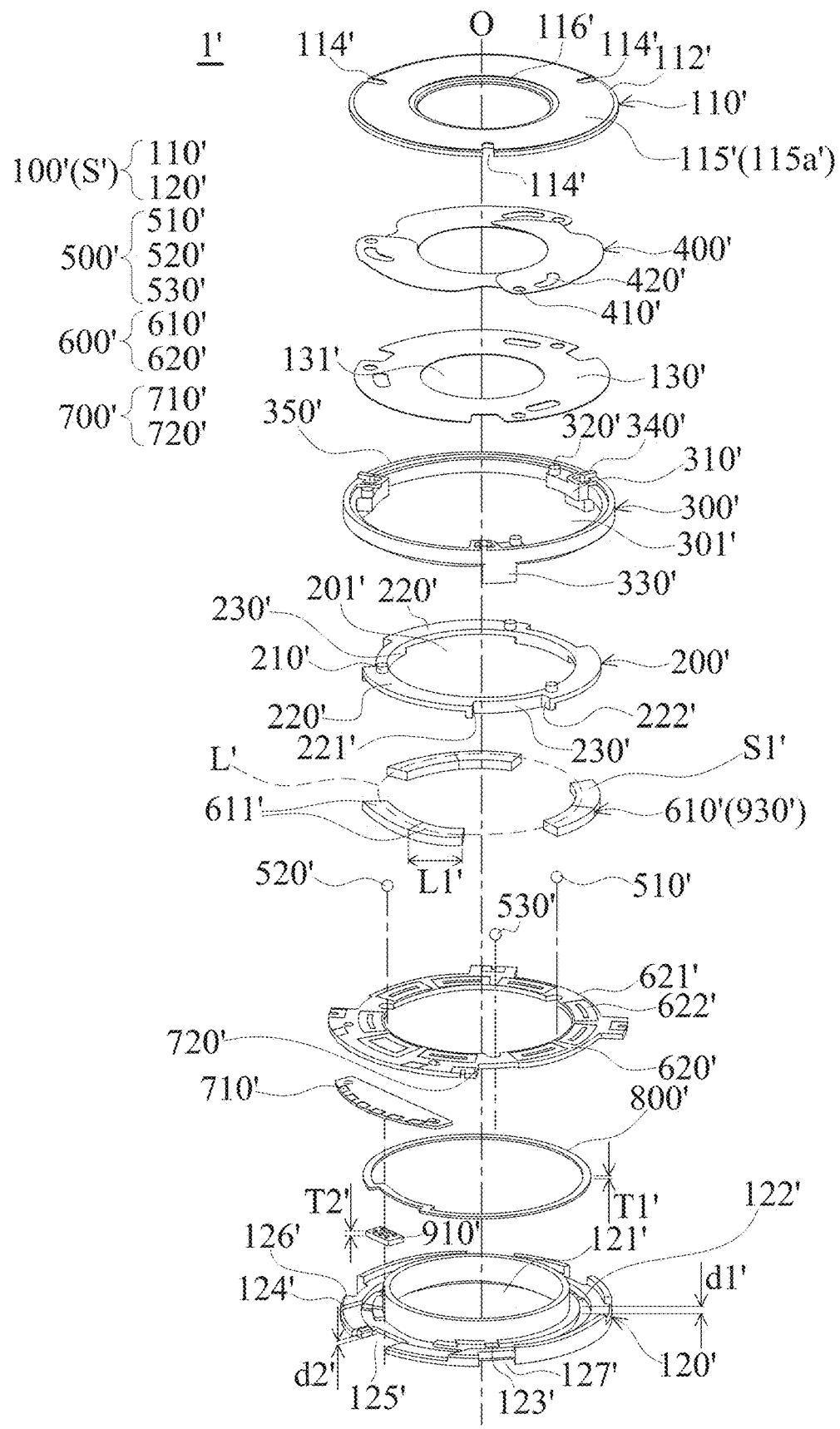
FIG. 8 is an exploded view of an optical element driving mechanism according to an embodiment of the present disclosure.
Figure 9:
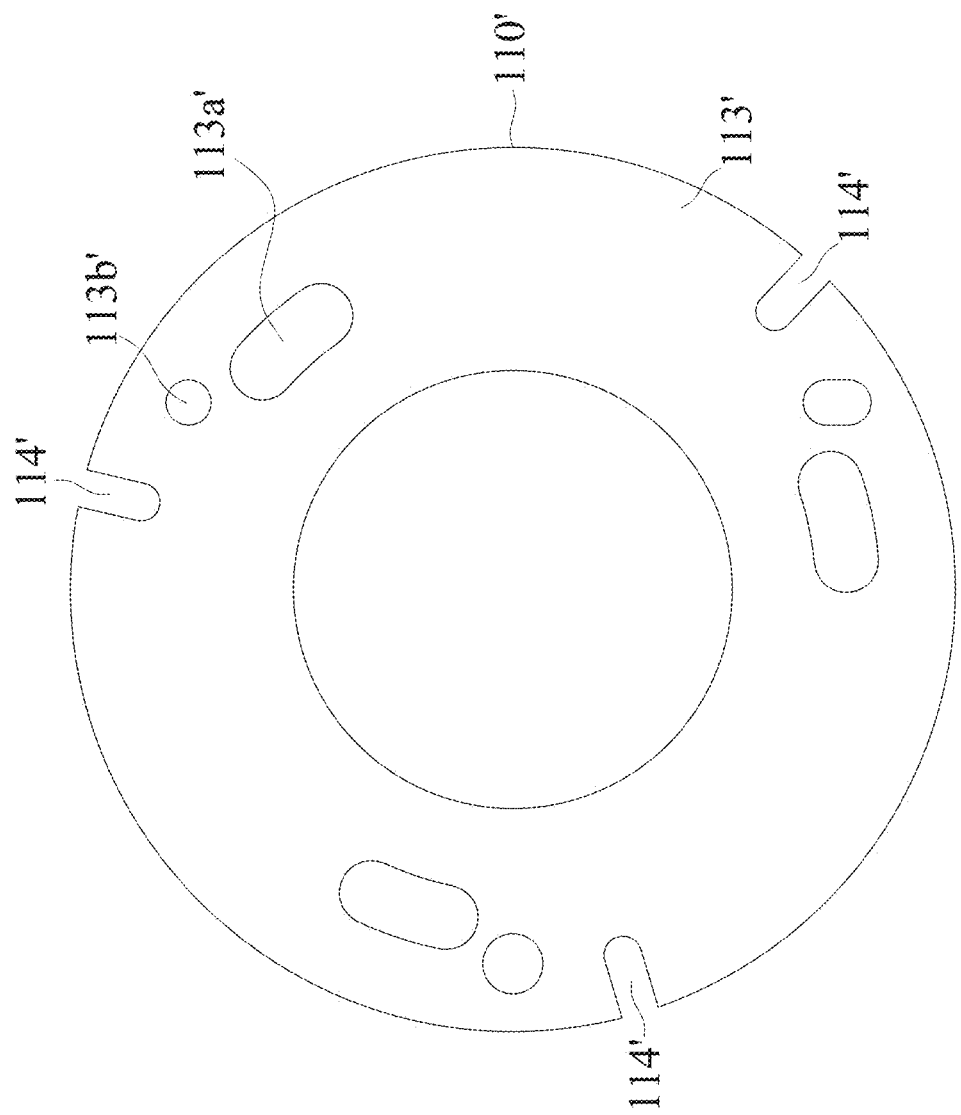
FIG. 9 is a bottom view of a partial structure of an optical element driving mechanism according to an embodiment of the present disclosure.
Figure 10:
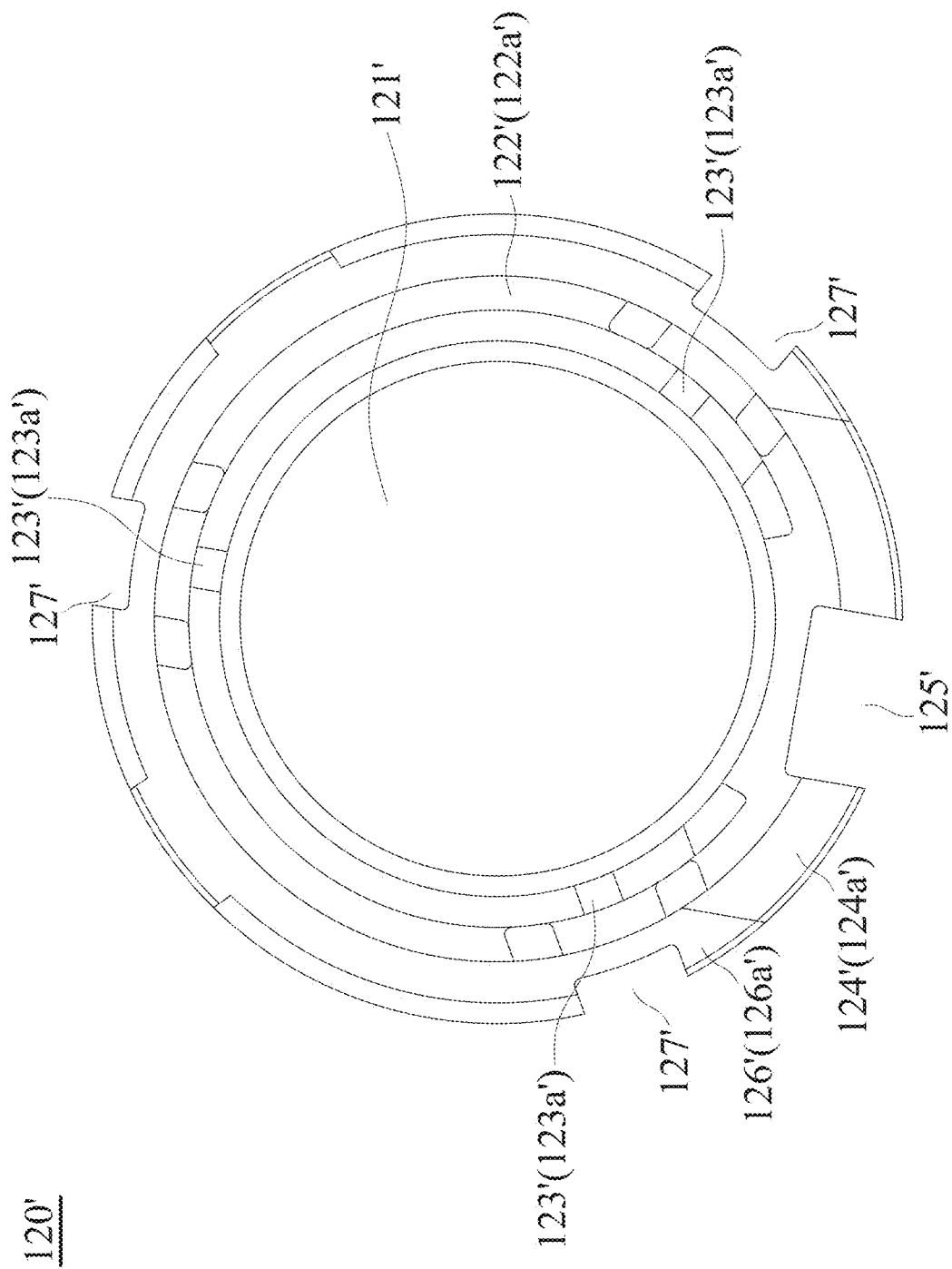
FIG. 10 is a top view of a partial structure of an optical element driving mechanism according to an embodiment of the present disclosure.

Refer to FIGS. 7 to 10. FIG. 7 is a perspective view of an optical element driving mechanism 1' according to an embodiment of the present disclosure. FIG. 8 is an exploded view of the optical element driving mechanism 1' according to an embodiment of the disclosure. FIG. 9 is a bottom view of a partial structure of the optical element driving mechanism 1' according to an embodiment of the disclosure. FIG. 10 is a top view of a partial structure of an optical element driving mechanism 1' according to an embodiment of the disclosure. The optical element driving mechanism 1' is similar to the optical element driving mechanism 1, having an optical axis O, including a fixed portion 100', a movable element 200', a stopping element 300', a plurality of blades 400', a guiding assembly 500', a driving assembly 600', a circuit assembly 700', a magnetically permeable element 800', and a sensing assembly 900'.

As shown in FIG. 8, the fixed portion 100' includes an upper cover 110' and a base 120'. The upper cover 110' and the base 120' are arranged along a direction that is parallel to the optical axis O, and the upper cover 110' is closer to the incident light than the base 120'. The upper cover 110' is fixedly connected to the base 120' via the stopping element 300'. The upper cover 110', the stopping element 300', and the base 120' may form a housing S' of the optical element driving mechanism 1' to protect various elements inside the optical element driving mechanism 1'.

The upper cover 110' has an opening 111', an upper surface 112', an inner surface 113', three concave portions 114', a first anti-reflection structure 115', and a second anti-reflection structure 116'. The opening 111' receives an incident light, the upper surface 112' faces the incident light, the inner surface 113' is the surface opposite to the upper surface 112', and has three first accommodating portions 113a' and three second accommodating portions 113b'. The first accommodating portions 113a' accommodate a part of the movable element 200', and the second accommodating portions 113b' accommodate a part of the stopping element 300'. The concave portion 114' accommodates a part of the stopping element 300'. The first anti-reflection structure 115' and the second anti-reflection structure 116' are used to reduce stray light.

The first anti-reflective structure 115' may be a plate-shaped structure, and attach to the upper surface 112' of the upper cover 110'. Or the first anti-reflective structure 115' may be formed by coating an anti-reflective material on the upper surface 112'. The first anti-reflection structure 115' has a first anti-reflection surface 115a', and the first anti-reflection surface 115a' faces the incident light. The first anti-reflection surface 115a' is not parallel to the optical axis O. More specifically, the first anti-reflection surface 115a' is perpendicular to the optical axis O. The reflectivity of the first anti-reflection surface 115a' is less than the reflectivity of the upper cover 110'.

The second anti-reflection structure 116' extends from the upper surface 112' to the opening 111', and forms an angle with the upper surface 112' and surrounds the opening 111'. More specifically, the second anti-reflection structure 116' is neither parallel nor perpendicular to the optical axis O. A surface of the second anti-reflective structure 116' close to the incident light may be coated with anti-reflective materials to form a second anti-reflective surface 116a'. The reflectivity of the second anti-reflective surface 116a' is less than that of the upper cover 110'.

In this embodiment, the optical element driving mechanism 1' may further include a third anti-reflection structure 130'. The third anti-reflection structure 130' is a plate-shaped structure with an opening 131' corresponding to the incident light, and the third anti-reflection structure 130' is disposed on stopping element 300'. When viewed in the direction that is perpendicular to the optical axis O, the third anti-reflection structure 130' is located between the blades 400' and the movable element 200'. When viewed along the direction that is parallel to the optical axis O, the third anti-reflection structure 130' at least partially overlaps the blades 400' and the movable element 200'.

As shown in FIGS. 8 and 10, the base 120' has an opening 121', a first concave portion 122', a second concave portion 123', a third concave portion 124', a fourth concave portion 125', a fifth concave portion 126', and the sixth concave portion 127'. When viewed along the direction that is parallel to the optical axis O, an area of the opening 111' of the upper cover 110' and an area of the opening 121' of the base 120' are different from an area of the opening 131' of the third anti-reflection structure 130'. More specifically, the area of the opening 111' of the upper cover 110' is larger than the area of the opening 131' of the third anti-reflection structure 130', and the area of the opening 121' of the base 120' is larger than the area of the opening 111' of the upper cover 110'. The opening 121' of the base 120' is used to correspond to an optical element (not shown), for example, an optical lens. With the above configuration of different opening sizes, the interference of stray light can be further avoided.

The first concave portion 122' accommodates the magnetically permeable element 800', and a depth d1' of the first concave portion 122' is greater than a thickness T1' of the magnetically permeable element 800'. The first concave portion 122' has a bottom surface 122a' that is perpendicular to the optical axis O and faces the magnetically permeable element 800'.

The second concave portion 123' accommodates at least a part of the guiding assembly 500'. The second concave portion 123' has a bottom surface 123a'. When viewed along the direction that is parallel to the optical axis O, the second concave portion 123' is adjacent to the first concave portion 122'. The second concave portion 123' is closer to the opening 121' of the base 120' than the first concave portion 122', which is different from the second concave portion 123 of the optical element driving mechanism 1. When viewed in the direction that is perpendicular to the optical axis O, the bottom surface 123a' of the second concave portion 123' is closer to the upper surface 112' of the upper cover 110' than the bottom surface 122a' of the first concave portion 122'.

The third concave portion 124' accommodates at least a part of the circuit assembly 700'. The third concave portion 124' has a bottom surface 124a'. When viewed along the direction that is parallel to the optical axis O, the third concave portion 124' is adjacent to the first concave portion 122', and the third concave portion 124' is farther from the opening 121' of the base 120' than the first concave portion 122'. When viewed along the direction that is perpendicular to the optical axis O, the bottom surface 124a' of the third concave portion 124' is closer to the upper surface 112' of the upper cover 110' than the bottom surface 122a' of the first concave portion 122'. By providing the first concave portion 122' and the third concave portion 124' to respectively accommodate the magnetically permeable element 800' and a portion of the circuit assembly 700', the distance between the magnetically permeable element 800' and the circuit assembly 700' is close to zero, thereby achieving the miniaturization of the optical element driving mechanism 1'.

The fourth concave portion 125' accommodates at least a part of the sensing assembly 900', and a depth d2' of the fourth concave portion 125' is greater than a thickness T2' of a part of the sensing assembly 900' to prevent the sensing assembly 900' from being impacted by other elements. The fourth concave portion 125' penetrates the base 120'. When viewed along the direction that is parallel to the optical axis O, the fourth concave portion 125' is adjacent to the first concave portion 122'. The fourth concave portion 125' is adjacent to the third concave portion 124', and the fourth concave portion 125' is farther away from the opening 121' of the base 120' than the first concave portion 122', which are different from the fourth concave portion 125 of the optical element driving mechanism 1.

The fifth concave portion 126' accommodates at least a part of the driving assembly 600'. The fifth concave portion 126' has a bottom surface 126a'. When viewed along the direction that is parallel to the optical axis O, the fifth concave portion 126' is adjacent to the first concave portion 122' and the third concave portion 124'. When viewed along the direction that is perpendicular to the optical axis O, the bottom surface 126a' of the fifth concave portion 126' is closer to the upper surface 112' of the upper cover 110' than the bottom surface 122a' of the first concave portion 122' and the bottom surface 124a' of the third concave portion 124'. The differences from the fifth concave portion 126 of the optical element driving mechanism 1 are that the fifth concave portion 126' is not adjacent to the second concave portion 123', and the bottom surface 126a' of the fifth concave portion 126' is closer to the upper surface 112' of the upper cover 110' than the bottom surface 123a' of the second concave portion 123'. By providing the first concave portion 122' and the fifth concave portion 126' to respectively accommodate the magnetically permeable element 800' and the driving assembly 600', the distance between the bottom surface 126a' of the fifth concave portion 126' and the bottom surface 122a' of the first concave portion 122' is greater than the thickness of the magnetically permeable element 800', so that there is a non-zero gap between the magnetically permeable element 800' and the driving element 600', and a part of the circuit element 700' may be accommodated as described above, so as to achieve the miniaturization of the optical element drive mechanism 1', and the distance between the magnetically permeable element 800' and the driving assembly 600' is still enough to make the magnetically permeable element 800' affect the driving assembly 600'.

The sixth concave portion 127' accommodates at least a part of the stopping element 300'. The difference from the sixth concave portion 127 of the optical element driving mechanism 1 is that the sixth concave portion 127' penetrates the base 120'. When viewed along the direction that is parallel to the optical axis O, the sixth concave portion 127' is adjacent to the fifth concave portion 126', and the sixth concave portion 127' is closer to the opening 121' of the base 120' than the first concave portion 122', the second concave portion 123', the third concave portion 124', and the fifth concave portion 126'.

A bonding element (not shown) can be disposed between the base 120' and each element. The bonding element directly contacts the base 120', the magnetically permeable element 800', the driving assembly 600', the circuit assembly 700', and the stopping element 300', so that the magnetically permeable element 800', the driving assembly 600', the circuit assembly 700', and the stopping element 300' are fixed to the base 120'.

Figure 11:
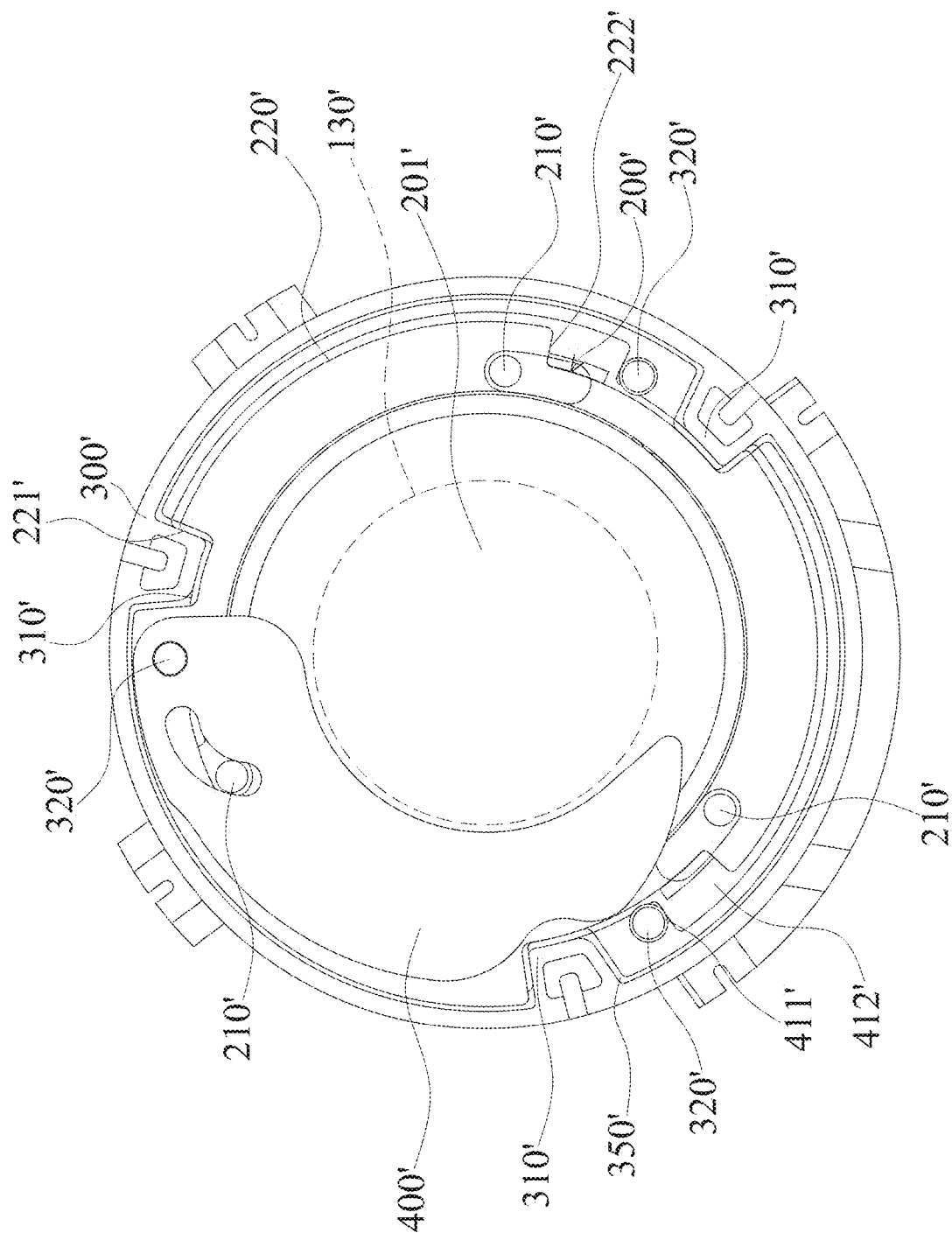
FIG. 11 is a top view of a partial structure of an optical element driving mechanism according to an embodiment of the present disclosure.
Figure 12:
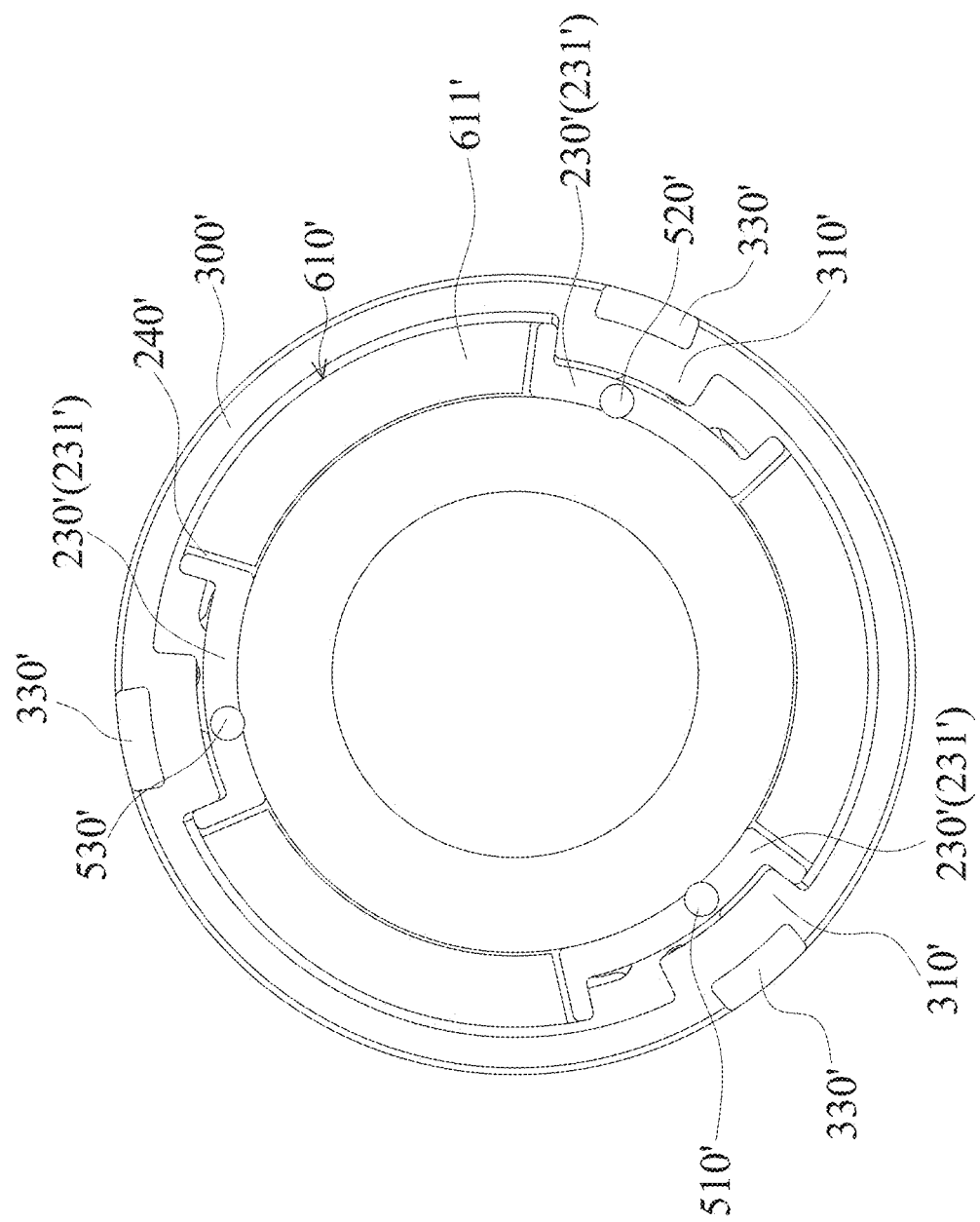
FIG. 12 is a bottom view of a partial structure of an optical element driving mechanism according to an embodiment of the present disclosure.

Refer to FIGS. 8 to 12. FIG. 11 is a top view of a partial structure of an optical element driving mechanism 1' according to an embodiment of the present disclosure. In order to clearly show the position of each element, only two blade 400' are shown, and the third anti-reflection structure 130' indicated by the dashed line are shown transparently. FIG. 12 is a bottom view of a partial structure of the optical element driving mechanism 1' according to an embodiment of the disclosure. The movable element 200' has three first protruding portions 210', three second protruding portions 220', three third protruding portions 230', three first accommodating portions 240', and an opening 201'. The first protruding portion 210' extends toward the upper cover 110' along the direction that is parallel to the optical axis O, passes through the blade 400' and is accommodated in the first accommodating portion 113a' of the upper cover 110'. The second protruding portion 220' extends away from the opening 201' along the direction that is perpendicular to the optical axis O, and has a first side 221' and a second side 222'. The first side 221' and the second side 222' contact the stopping element 300'. The third protruding portion 230' extends toward the base 120' along the direction that is parallel to the optical axis O and contacts the guiding assembly 500'. The first accommodating portion 240' is formed between the two third protruding portions 230' and accommodates a part of the driving assembly 600'. The opening 201' receives incident light.

The stopping element 300' has three stopping portions 310', three first protruding portions 320', three second protruding portions 330', three third protruding portions 340', a first accommodating portion 350', and an opening 301'. When viewed along the direction that is parallel to the optical axis O, the stopping element 300' is farther away from the optical axis O than the movable element 200'. The stopping portion 310' extends toward the opening 301' along the direction that is perpendicular to the optical axis O, and restricts the movable element 200' to move within a limiting range relative to the fixed portion 100'. More specifically, the second protruding portion 220' of the movable element 200' is disposed between the two stopping portions 310'. When the first side 221' of the second protruding portion 220' contacts one of the stopping portions 310', the movable element 200' stops moving, And when the second side 222' of the second protruding portion 220' contacts the other stopping portion 310', the movable element 200' also stops moving. Therefore, the movement range of the movable element 200' moving between the two stopping portions 310' may be regarded as the limiting range mentioned above.

The first protruding portion 320' extends toward the upper cover 110' along the direction that is parallel to the optical axis O, passes through the third anti-reflection structure 130' and the blade 400', and is accommodated in the second accommodating portion 113b of the upper cover 110'. The second protruding portion 330' extends toward the base 120' along the direction that is parallel to the optical axis O, and may be fixed to the sixth concave portion 127' of the base 120' by the bonding element. In the direction that is parallel to the optical axis O, the maximum size of the stopping element 300' is greater than the maximum size of the base 120'. The third protruding portion 340' extends toward the upper cover 110' along the direction that is parallel to the optical axis O, and may be fixed to the concave portion 114' of the upper cover 110' by the bonding element. The first accommodating portion 350' accommodates the third anti-reflection structure 130'.

In this embodiment, there are three blades 400', each blade 400' has a connection portion 410' and a shielding portion 420', and the connection portion 410' has a hole 411' and an accommodating portion 412'. The first protruding portion 320' of the stopping element 300' passes through the hole 411' and is accommodated in the upper cover 110', and the first protruding portion 210' of the movable element 200' passes through the accommodating portion 412' and is accommodated in the upper cover 110'. The shielding portion 420' is configured to shield incident light.

When the driving assembly 600' drives the movable element 200' to move relative to the fixed portion 100', the movable element 200' rotates around a first rotating shaft. In this embodiment, the first rotating shaft is the optical axis O. The movement of the movable element 200' further causes the blade 400' to move. More specifically, when the movable element 200' rotates around the first rotating shaft, each first protruding portion 210' of the movable element 200' is moved on each accommodating portion 412' of blade 400', so that the three blades 400' may be rotated around the first protruding portion 210' (which can be regarded as the second rotating shaft to the fourth rotating shaft) of the stopping element 300' as the rotating shaft. Therefore, when viewed along the direction that is parallel to the optical axis O, an overlapping area of the shielding portion 420' and the opening 111' may be changed. The first rotating shaft is different from the second rotating shaft to the fourth rotating shaft, and the first rotating shaft is parallel to the second rotating shaft to the fourth rotating shaft. Although the number of blades 400' is three in this embodiment, it is not limited to this, and can be changed as required.

Figure 13:
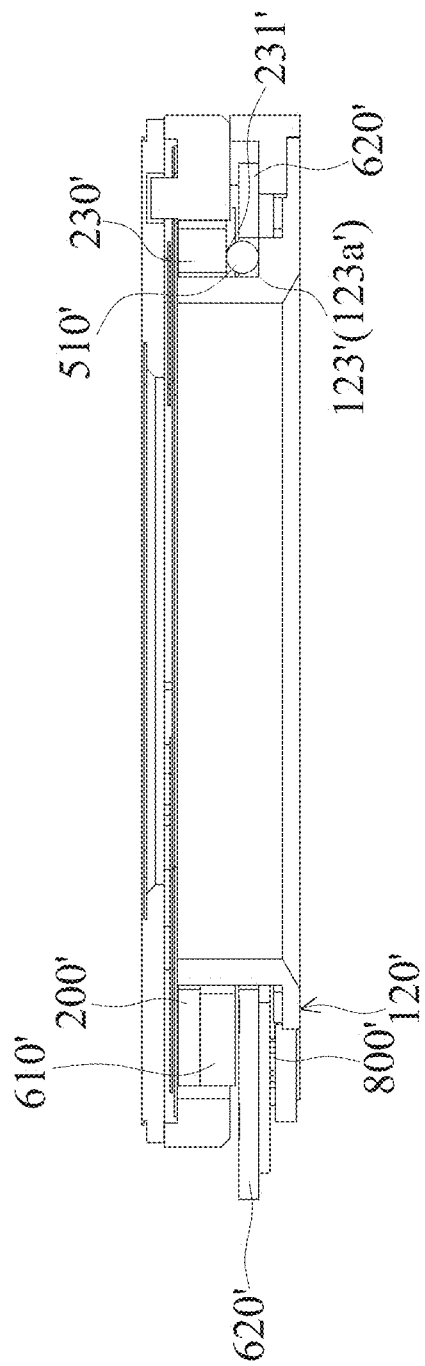
FIG. 13 is a cross-sectional view of the optical element driving mechanism taken along line A-A' in FIG. 7.

Refer to FIGS. 8 to 13. FIG. 13 is a cross-sectional view of the optical element driving mechanism 1' taken along the line A-A' of FIG. 7. The guiding assembly 500' includes a first intermediate element 510', a second intermediate element 520', and a third intermediate element 530', which are spherical. The first intermediate element 510', the second intermediate element 520', and the third intermediate element 530' may be moved relative to the fixed portion 100' or the movable element 200'. When viewed along the direction that is parallel to the optical axis O, the first intermediate element 510', the second intermediate element 520', and the third intermediate element 530' are disposed around the optical axis O. When viewed along the direction that is parallel to the optical axis O, the optical axis O passes through a triangle formed by the first intermediate element 510', the second intermediate element 520', and the third intermediate element 530'. Although the guiding assembly 500' has three intermediary elements in this embodiment, the number and shape of the intermediary elements are not limited to this, and can be changed as required.

The guiding assembly 500' is movably disposed between the fixed portion 100' and the movable element 200', which may reduce the friction between the fixed portion 100' and the movable element 200'. When viewed along the direction that is perpendicular to the optical axis O, the driving assembly 600' and the guiding assembly 500' at least partially overlap. When viewed along the direction that is parallel to the optical axis O, the driving assembly 600' and the guiding assembly 500' do not overlap. More specifically, the guiding assembly 500' is movably disposed between the second concave portion 123' of the base 120' and the third protruding portion 230' of the movable element 200'. The following uses the first intermediate element 510' to illustrate the relationship between the guiding assembly 500' and the fixed portion 100' and the movable element 200'. The second intermediate element 520' and the third intermediate element 530' are similar to the first intermediate element 510', and are not described in detail here. The third protruding portion 230' and the second concave portion 123' restrict the range of movement of the first intermediate element 510'. The third protruding portion 230' has a first guiding surface 231'. The bottom surface 123a' of the second concave portion 123' may be regarded as a second guiding surface 123a'. The first intermediate element 510' directly contacts the first guiding surface 231' and the second guiding surface 123a', and the first intermediate element 510' may move relative to the first guiding surface 231' and the second guiding surface 123a'. An area of the first guiding surface 231' is different from an area of the second guiding surface 123a'. In the present embodiment, the area of the first guiding surface 231' is larger than the area of the second guiding surface 123a'.

More specifically, as shown in FIG. 10, when viewed along the direction that is parallel to the optical axis O, the second concave portion 123' of the base 120' has a shape that just accommodates the first intermediate element 510', and as shown in FIG. 12, the first guiding surface 231' of the movable element 200' has a shape larger than that of the first intermediate element 510'. When the driving assembly 600' drives the movable element 200' to move, the first intermediate element 510' may be rotated in the same location of the second concave portion 123' relative to the fixed portion 100', and the first intermediate element 510' may be rotated a distance on the first guiding surface 231' relative to the movable portion 200'.

However, the configuration of the guiding assembly 500', the movable element 200', and the fixed portion 100' is not limited to this, and may be changed according to requirements. For example, the first intermediate element 510' may also be fixed to the second concave portion 123'. In some embodiments, the area of the first guiding surface 231' is smaller than the area of the second guiding surface 123a'. A suitable material may be disposed between the movable element 200' and the fixed portion 100' rather than the first intermediate element 510' to reduce the friction between the movable element 200' and the fixed portion 100'.

Figure 14:
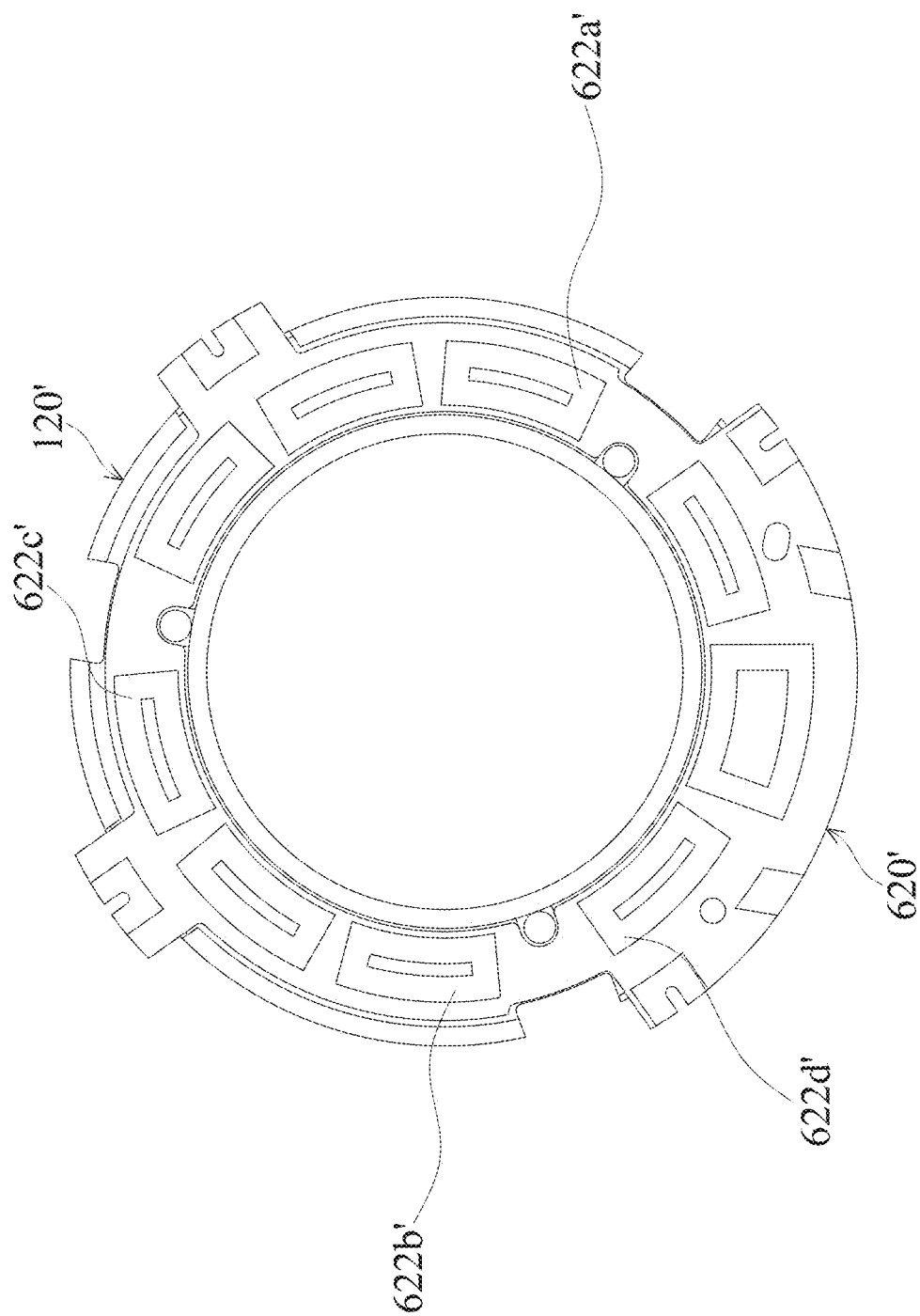
FIG. 14 is a top view of a partial structure of an optical element driving mechanism according to an embodiment of the present disclosure.

Refer to FIG. 8, FIG. 12, and FIG. 14. FIG. 14 is a top view of a partial structure of an optical element driving mechanism 1' according to an embodiment of the present disclosure. The driving assembly 600' includes three magnetic elements 610' and a driving coil set 620'. The three magnetic elements 610' are symmetrically disposed in the first accommodating portions 240' of the movable element 200', and may be fixed to the movable element 200' by the bonding element. When viewed along the direction that is perpendicular to the optical axis O, the driving assembly 600' is at least partially located between the stopping element 300' and the base 120'. When viewed along the direction that is parallel to the optical axis O, the center of the magnetic element 610' is located between two adjacent stopping portions 310'. The magnetic element 610' includes two magnetic units 611', each magnetic unit 611' has an N-pole and an S-pole, and the two magnetic units 611' are disposed along a first imaginary line L' and formed two magnetic pole surfaces S1'. Two magnetic pole surfaces S1' are opposite each other, and one of the magnetic pole surfaces S1' faces the driving coil set 620'. The first imaginary line L' is not parallel to the optical axis O. More specifically, the first imaginary line L' is arc-shaped and perpendicular to the optical axis O, and the first imaginary line L' does not intersect the optical axis O. In this embodiment, the magnetic unit 611' may be a permanent magnet.

The driving coil set 620' is fixed to the fixed portion 100'. More specifically, the driving coil 620' is disposed in the fifth concave portion 126' of the base 120'. The driving coil set 620' includes a main body 621' and a plurality of driving coils 622'. The plurality of driving coils 622' are embedded in the main body 621'. The number of the driving coils 622' corresponds to the number of the magnetic units 611', and the winding axis of the driving coil 621' is parallel to the optical axis O, and the winding axis passes through the magnetic element 610'. In this embodiment, four of the plurality of driving coils 622' include a first driving coil 622a', a second driving coil 622b', a third driving coil 622c', and a fourth driving coil 622d'. When viewed along the direction that is parallel to the optical axis O, the first driving coil 622a' and the second driving coil 622b' are located on both sides of the optical axis O and symmetrical to the optical axis O, and the shortest distance between the first drive coil 622a' and the third drive coil 622c' is approximately equal to the shortest distance between the first drive coil 622a' and the fourth drive coil 622d'.

Compared with a ring-shaped magnetic element 610 of the optical element driving mechanism 1, the three arc-shaped magnetic elements 610' shown in this embodiment may save manufacturing costs. But the shape and number of the magnetic element is not limited to this, it can be changed as required. For example, the magnetic element 610 and the magnetic element 610' may be used interchangeably.

Figure 15:
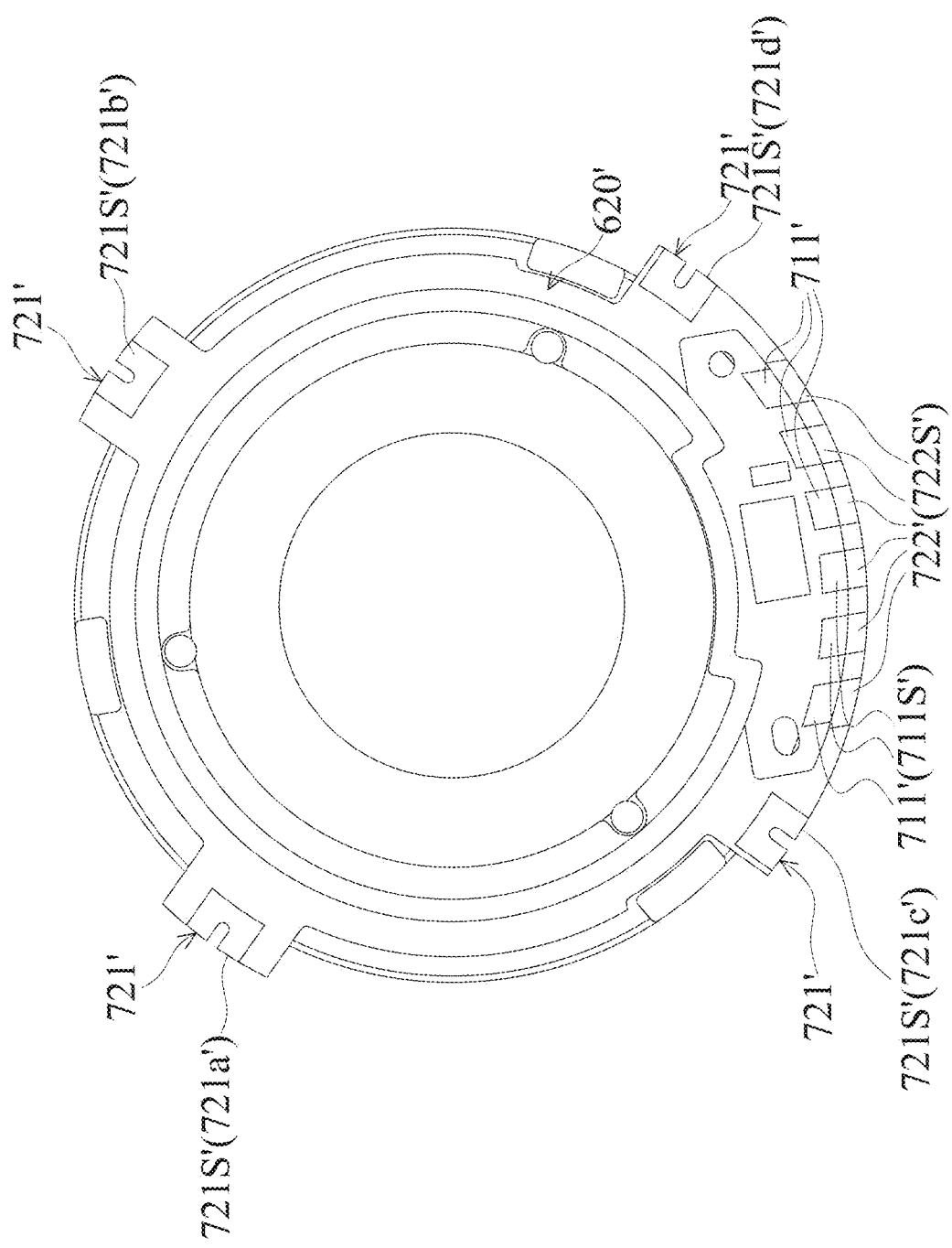
FIG. 15 is a bottom view of a partial structure of an optical element driving mechanism according to an embodiment of the present disclosure.

Refer to FIG. 8, FIG. 14, and FIG. 15. FIG. 15 is a bottom view of a partial structure of an optical element driving mechanism 1' according to an embodiment of the present disclosure. The circuit assembly 700' includes a first circuit element 710' and a second circuit element 720', and the first circuit element 710' and the second circuit element 720' are plate-shaped structure, and the first circuit element 710' and the second circuit element 720' are independent entities. When viewed along the direction that is perpendicular to the optical axis O, the first circuit element 710' and the second circuit element 720' are parallel to each other, and the first circuit element 710' and the second circuit element 720' may have a space that is not zero to dispose the bonding element.

The first circuit element 710' is electrically connected to the sensing assembly 900' and the driving assembly 600'. When viewed along the direction that is perpendicular to the optical axis O, the first circuit element 710' is located between the magnetically permeable element 800' and the driving coil set 620'. The first circuit element 710' has a plurality of internal connection portions 711' and a main body portion 712'. The internal connection portion 711' is a part exposed by removing part of the main body portion 712'. Therefore, in the direction that is parallel to the optical axis O, a thickness of the internal connection portion 711' is smaller than a thickness of the main body portion 712'. Each inner connection portion 711' is parallel to each other and has two connection portion surfaces 711S'. The two connection portion surfaces 711S' are opposite, and one of the two connection portion surfaces 711S' faces away from the direction of incident light.

The second circuit element 720' is disposed on the driving coil set 620', and includes four external connection portions 721' and a plurality of internal connection portions 722'. The external connection portions 721' extends from the main body portion 621' to directions that are away from the optical axis O. The external connection portions 721' is a part exposed by removing part of the main body portion 621'. The four external connection portions 721' are a first external connection portion 721a', a second external connection portion 721b', the third external connection portion 721c', and the fourth external connection portion 721d'. The first external connection portion 721a' is not parallel to the second external connection portion 721b', and the third external connection portion 721c' is not parallel to the fourth external connection portion 721d'. The first external connection portion 721a' may be parallel to the third external connection portion 721c' or not, and the second external connection portion 721b' may be parallel to the fourth external connection portion 721d' or not. Each external connection portion 721' has two connection portion surfaces 721S'. The two connection portion surfaces 721S' are opposite to each other, one connection portion surface 721S' faces the direction close to the incident light, and the other connection portion surface 721S' faces the direction away from the incident light. Therefore, the same external connection portion 720' may be connected to the external circuit by different connection portion surfaces 721S'.

The internal connection portions 722' are connected to the first circuit element 710', and the internal connection portion 722' extends from the main body 621' to a extending direction that is away from the optical axis O. The internal connection portion 722' is a part that is exposed by removing part of the main body 621'. The extending direction of the inner connection portion 722' is different from that of the first external connection portion 721a', the second external connection portion 721b', the third external connection portion 721c', and the fourth external connection portion 721d', and each inner connection portion 722' is parallel to each other and have a connection portion surface 722S'. The connection portion surface 722S' faces the direction that is away from the incident light. When viewed along the direction that is parallel to the optical axis O, the internal connection portion 711' of the first circuit element 710' and the internal connection portion 722' of the second circuit element 720' at least partially overlap. The bonding element (for example, a solder ball) may be disposed on the connection portion surface 711S' and the connection portion surface 722S' to connect the first circuit element 710' and the second circuit element 720'.

Although the circuit assembly 700' is not integrally formed in this embodiment, it is not limited to this, and can be interchanged with the circuit assembly 700 of the optical element driving mechanism 1 as required.

The magnetically permeable element 800' has a ring structure and is disposed in the first concave portion 122' of the base 120'. The magnetically permeable element 800' corresponds to the magnetic element 610' to adjust the magnetic force distribution of the magnetic element 610', thereby increasing the driving force of the driving assembly 600'.

The sensing assembly 900' is used to sense the relative movement of the fixed portion 100' and the movable element 200'. At least a part of the sensing assembly 900' is disposed on the movable element 200', and at least another part of the sensing assembly 900' is disposed on the fixed portion 100'. For example, the sensing assembly 900' may include a sensing element 910', an electronic element 920', and a sensing magnetic element 930'. The sensing element 910' and the electronic element 920' are disposed on the first circuit element 710', and are accommodated in the fourth concave portion 125' of the base 120'. The sensing element 910' may be, for example, a Hall effect sensor, a magnetoresistance sensor, and a tunnel magnetoresistance effect sensor or a fluxgate, etc., and is disposed to sense the magnetic field of the sensing magnetic element 930' on the movable element 200' to obtain the position of the movable element 200' relative to the base 120', but it is not limited to this. For example, in this embodiment, the magnetic element 610' may be used as the sensing magnetic element 930' at the same time. When viewed along the direction that is parallel to the optical axis O, the magnetic element 610' and the sensing element 910' at least partially overlap. When viewed along the direction that is parallel to the optical axis O, the sensing element 910' and the first drive coil 622a', the second drive coil 622b', the third drive coil 622c', and the fourth driving coils 622d' do not overlap. When viewed along the direction that is parallel to the optical axis O, the sensing element 910' and the magnetically permeable element 800' do not overlap.

The optical element driving mechanism 1' applied to the adjustment of the aperture is described as follows. The movable element 200' is located at an initial position. When viewed along the direction that is parallel to the optical axis O, the sensing element 910' overlaps a boundary of the two magnetic units 611'. The sensing assembly 900' outputs a signal corresponding to the target aperture value to the circuit assembly 700', and the circuit assembly 700' outputs a current to the driving coil set 620', so that an electromagnetic force is generated between the driving coil set 620' and the magnetic element 610'. The magnetic element 610' is driven by the electromagnetic force, so that the movable element 200' is rotated around the optical axis O relative to the fixed portion 100'. When the movable element 200' rotates, each blade 400' are rotated around the first protruding portion 320' of the stopping element 300' as the rotating shafts, so that the shielding portion 420' shields the opening 111' to achieve the target value of the aperture.

As described above, the movable element 200' may be controlled to rotate within a control range relative to the fixed portion 100' by the signal, and the stopping element 300' is used to restrict the movable element 200' rotating within the limiting range. In this embodiment, the limiting range of the rotation of the movable element 200' is smaller than the length L1' of the magnetic unit 611'. That is, the limiting range of the movement of the movable element 200' does not exceed one of the magnetic poles of the magnetic unit 611'. The limiting range is greater than the control range, that is, a rotatable angle of the limiting range is greater than a rotatable angle of the control range. In this embodiment, the limiting range of rotation of the movable element 200' is at least greater than 30 degrees.

Figure 16:
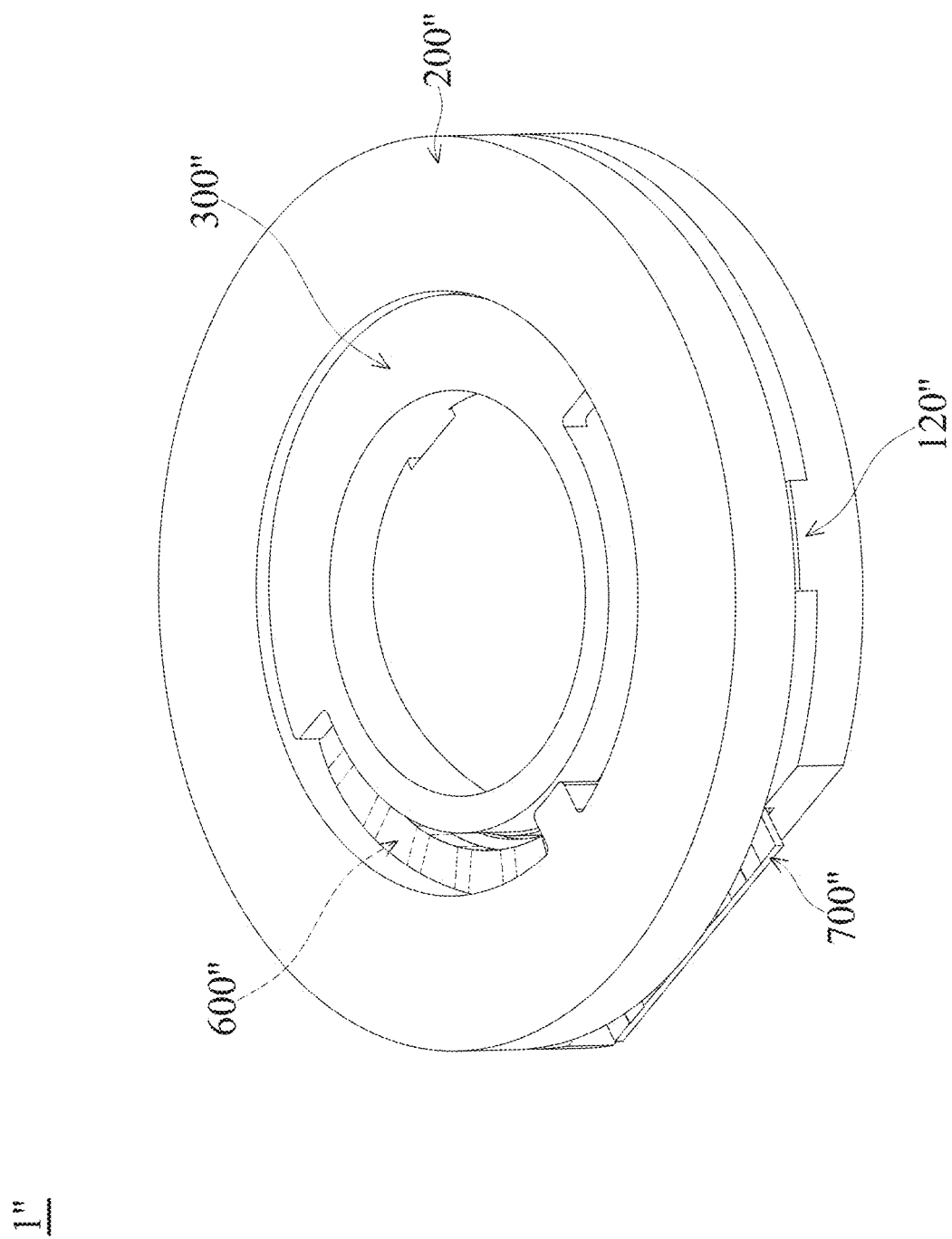
FIG. 16 is a perspective view of an optical element driving mechanism according to an embodiment of the present disclosure.
Figure 17:
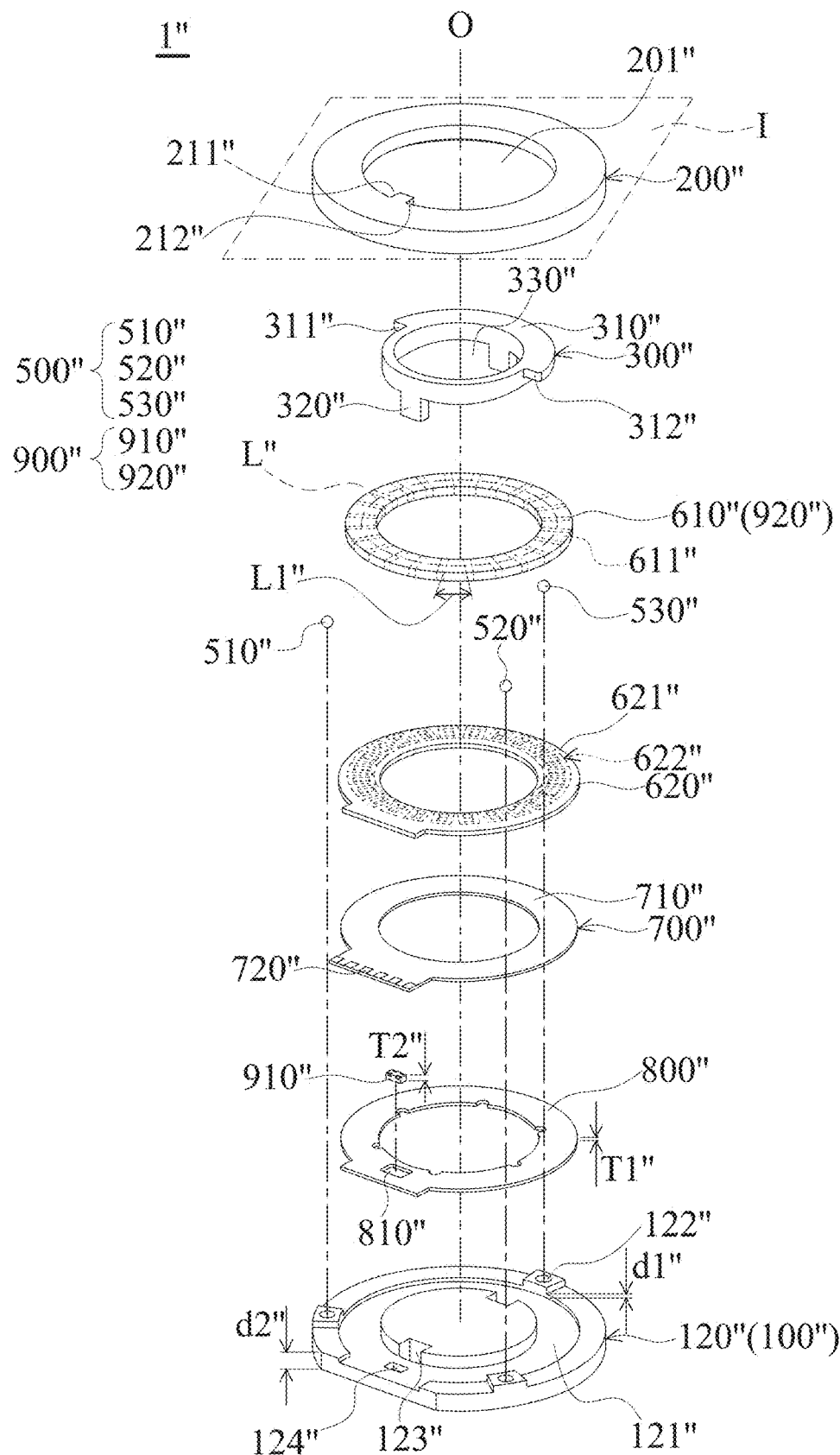
FIG. 17 is an exploded view of an optical element driving mechanism according to an embodiment of the present disclosure.
Figure 18:
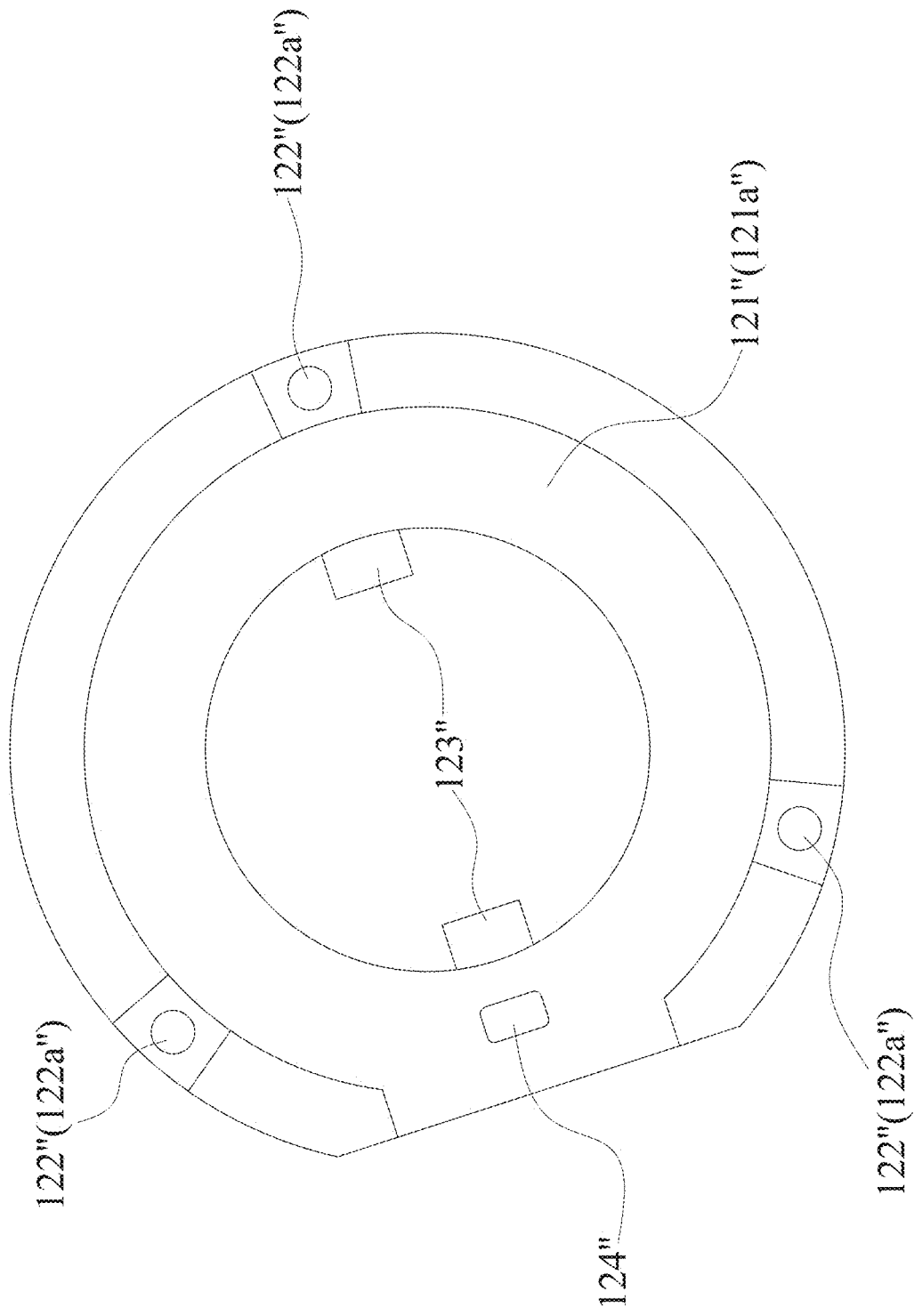
FIG. 18 is a top view of a partial structure of an optical element driving mechanism according to an embodiment of the present disclosure.

Refer to FIGS. 16 to 18. FIG. 16 is a perspective view of an optical element driving mechanism 1" according to an embodiment of the present disclosure. FIG. 17 is an exploded view of the optical element driving mechanism 1" according to an embodiment of the present disclosure. FIG. 18 is a top view of a partial structure of an optical element driving mechanism 1" according to an embodiment of the present disclosure. The optical element driving mechanism 1" has an optical axis O, including a fixed portion 100", a movable element 200", a stopping element 300", a guiding element 500", a driving element 600", a circuit element 700", a magnetically permeable element 800", and a sensing assembly 900".

As shown in FIG. 17, the fixed portion 100' includes an upper cover (not shown) and a base 120". In this embodiment, the upper cover may be the same as the upper cover 110 of the optical element driving mechanism 1 or the upper cover 110' of the driving mechanism 1', and it will not be repeated here.

The base 120" has a first concave portion 121", a second concave portion 122", a third concave portion 123", and a fourth concave portion 124". The first concave portion 121" accommodates the magnetically permeable element 800", and a depth d1" of the first concave portion 121" is greater than a thickness T1" of the magnetically permeable element 800". The first concave portion 121" has a bottom surface 121a". The bottom surface 121a" is perpendicular to the optical axis O and faces the magnetically permeable element 800".

The second concave portion 122" accommodates at least a part of the guiding assembly 500". The second concave portion 122" has a bottom surface 122a", and the bottom surface 122a" matches the shape of the guiding assembly 500". When viewed along the direction that is parallel to the optical axis O, the second concave portion 122" is adjacent to the first concave portion 121", and the second concave portion 122" is farther from the optical axis O than the first concave portion 121". When viewed along the direction that is perpendicular to the optical axis O, the bottom surface 122a" of the second concave portion 122" is closer to an incident surface I of an incident light than the bottom surface 121a" of the first concave portion 121".

The third concave portion 123" accommodates at least a part of the stopping element 300". The third concave portion 123" penetrates the base 120". When viewed along a direction that is parallel to the optical axis O, the third concave portion 123" is adjacent to the first concave portion 121", and the third concave portion 123" is closer to the optical axis O than the first concave portion 122".

The fourth concave portion 124" accommodates at least a part of the sensing assembly 900", and the depth d2" of the fourth concave portion 124" is greater than the thickness T2" of a part of the sensing assembly 900" to prevent the sensing assembly 900" from being impacted by other elements. The fourth concave portion 124" has a bottom surface 124a". When viewed along the direction that is parallel to the optical axis O, the fourth concave portion 124" is adjacent to the first concave portion 121", and the fourth concave portion 124" is further away from the optical axis O than the third concave portion 123", and the fourth concave portion 124" is closer to the optical axis O than the second concave portion 122".

A bonding element (not shown) may be disposed between the base 120" and each element. The bonding element directly contacts the base 120", the magnetically permeable element 800", and the stopping element 300", so that the magnetically permeable element 800" and stopping element 300" are fixed to the base 120".

Figure 19:
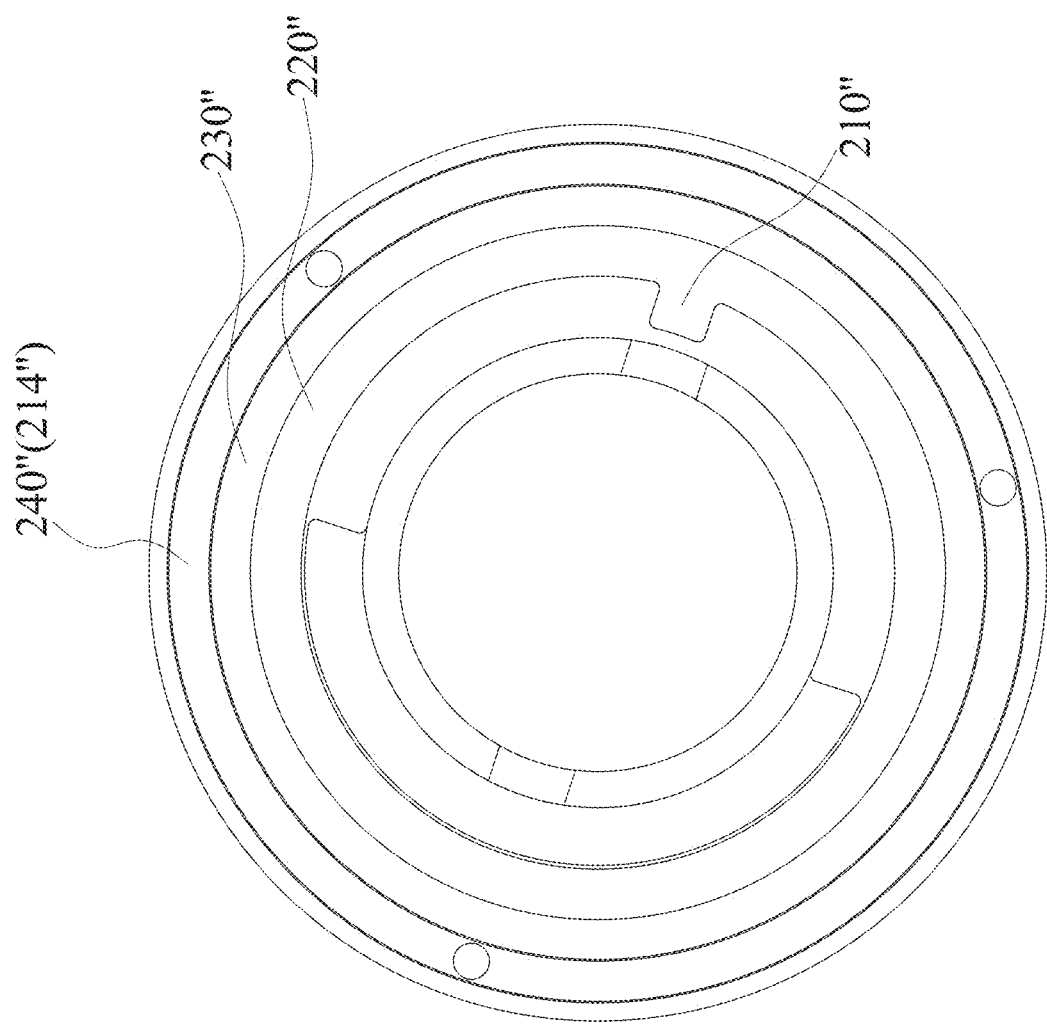
FIG. 19 is a bottom view of a partial structure of an optical element driving mechanism according to an embodiment of the present disclosure.

Refer to FIGS. 17 and 19. FIG. 19 is a bottom view of a partial structure of an optical element driving mechanism 1" according to an embodiment of the present disclosure. The movable element 200" has a first protruding portion 210", a second protruding portion 220", a first accommodating portion 230", a second accommodating portion 240", and an opening 201". The first protruding portion 210" extends toward the optical axis O along the direction that is perpendicular to the optical axis O, and has a first side 211" and a second side 212". The first side 211" and the second side 212" are contactable to the stopping element 300".

The second protruding portion 220" has a ring-shaped structure and extends toward the base 120" along the direction that is parallel to the optical axis O. The second protruding portion 220" separates the first accommodating portion 230" and the second accommodating portion 240". The first accommodating portion 230" accommodates a part of the driving assembly 600". The second accommodating portion 240" accommodates a part of the guiding assembly 500". When viewed along the direction that is parallel to the optical axis O, the first accommodation portion 230" is closer to the optical axis O than the second accommodating portion 240", and the first protruding portion 210" is closer to the optical axis O than the first accommodating portion 230". The opening 201" accommodates a part of the stopping element 300" and receives the incident light.

The stopping element 300" has a stopping portion 310", two protruding portions 320", and an opening 330". The stopping portion 310" is an arc-shaped structure, and has a first side wall 311" and a second side wall 312". The first side wall 311" and the second side wall 312" extend along the direction that is parallel to the optical axis O, and respectively contact the first side 211" and the second side 212" of the movable element 200". The stopping element 300" may restrict the movable element 200" to move within a limiting range relative to the fixed portion 100". More specifically, the first protruding portion 210" of the movable element 200" is disposed between the first side wall 311" and the second side wall 312" of the stopping element 300". When the first side 211" of the protruding portion 210" contacts the first side wall 311" of the stopping portion 310", the movable element 200" stops moving. And when the second side 212" of the first protruding portion 210" contacts the second side wall 312" of the stopping portion 310", the movable element 200" also stops moving. Therefore, the range of movement of the movable element 200" between the two side walls of the stopping portion 310" may be regarded as the limiting range. The protruding portion 320" extends toward the base 120" along the direction that is parallel to the optical axis O, and may be fixed to the third concave portion 123" of the base 120" by the bonding element.

In this embodiment, although the blade is not shown, similar to the previous two embodiments, similar blades may be disposed on the movable element 200".

The guiding assembly 500" of this embodiment is similar to the guiding assembly 500 of the optical element driving mechanism 1, and includes a first intermediate element 510", a second intermediate element 520", and a third intermediate element 530", which are spherical. The guiding assembly 500" is movably disposed between the second concave portion 122" of the base 120" and the second accommodating portion 240" of the movable element 200". The second accommodating portion 240" has a first guiding surface 241". The bottom surface 122a" of the second concave portion 122" may be used as a second guiding surface 122a", and the guiding assembly 500" directly contacts the first guiding surface 231" and the second guiding surface 122a". The guiding assembly 500" may move relative to the first guiding surface 231" and the second guiding surface 122a". An area of the first guiding surface 231" is different from an area of the second guiding surface 122a". In this embodiment, the area of the first guiding surface 231" is larger than the area of the second guiding surface 122a".

More specifically, as shown in FIG. 18, when viewed along the direction that is parallel to the optical axis O, the second concave portion 122" of the base 120" has a shape that just accommodates the first intermediate element 510", and as shown in FIG. 19, the first guiding surface 231" of the movable element 200" has a shape larger than that of the first intermediate element 510". When the driving assembly 600" drives the movable element 200" to move, the first intermediate element 510" may be rotated in the same location of the second concave portion 122" relative to the fixed portion 100", and the first intermediate element 510" may rotate a distance on the first guiding surface 231" relative to the movable portion 200".

One of the differences between this embodiment and the optical element driving mechanism 1 is that the first accommodating portion 230" of this embodiment is a ring-shaped concave portioned structure. Therefore, the rotating distance of the first intermediate element 510" on the first guiding surface 231" may be longer than the rotating distance of the first intermediate element 510 on the first guiding surface 231.

However, the configuration of the guiding assembly 500", the movable element 200" and the fixed portion 100" is not limited to this, and may be changed according to requirements. For example, a similar configuration of the guiding assembly 500', the movable element 200' and the fixed portion 100' in the optical element driving mechanism 1' may be used.

As shown in FIG. 17, the driving assembly 600", the circuit assembly 700", the magnetically permeable element 800", and the sensing assembly 900" in this embodiment is similar to the driving assembly 600, the circuit assembly 700, the magnetically permeable element 800, and the sensing assembly 900 of the optical element driving mechanism 1. The driving element 600" includes a magnetic element 610" and a driving coil set 620". The magnetic element 610" is composed of a plurality of magnetic units 611" arranged in a ring structure. The circuit assembly 700" includes a first circuit element 710" having a plate-shaped structure and a plurality of external connection portions 720". The magnetically permeable element 800" has an accommodating portion 810", and the sensing assembly 900" may include a sensing element 910" and the sensing magnetic element 920". Other detailed features are similar to that in the optical element driving mechanism 1 and the optical element driving mechanism 1', and will not be repeated here.

One of the differences between this embodiment and the optical element driving mechanism 1 is that the magnetic element 610" is disposed in the first accommodating portion 230" of the movable element 200" and may be fixed to the movable element 200" by the bonding element. In addition, the driving coil set 620" has a similar shape to the circuit assembly 700" and the magnetically permeable element 800", and may be fixed by the bonding element to be disposed on the first concave portion 121" of the base 120".

Although the driving assembly 600", the circuit assembly 700", and the magnetically permeable element 800", and the sensing assembly 900" of this embodiment are similar to those in the optical element driving mechanism 1, but it is not limited to this, and may be changed according to requirements. For example, similar elements in the optical element driving mechanism 1' may also be used.

The operation of the optical element driving mechanism 1" is described as follows. The movable element 200" is located at an initial position. When viewed along the direction that is parallel to the optical axis O, the sensing element 910" overlaps a boundary of the two magnetic units 611". The sensing assembly 900" outputs a signal to the circuit assembly 700", and the circuit assembly 700" outputs a current to the driving coil set 620", so that an electromagnetic force is generated between the driving coil set 620" and the magnetic element 610". The electromagnetic force drives the magnetic element 610", so that the movable element 200" is rotated around the optical axis O relative to the fixed portion 100".

As described above, the movable element 200" may be controlled to rotate within a control range relative to the fixed portion 100" by the signal, and the stopping element 300" may be used to restrict the movable element 200" rotating within the limiting range. In this embodiment, the open loop control is adopted and the AC signal is used to enable the movable element 200" to achieve large-angle rotation. Unlike the movable elements 200, 200', the limiting range of the movement of the movable element 200" may exceed one of the magnetic poles of the magnetic unit 611". In other words, the limiting range of the movable element 200" may exceed a length of the magnetic unit 611". Therefore, in addition to changing the aperture size, the optical element driving mechanism 1" in this embodiment may also be used to drive elements that require long-stroke rotation.

As described above, an embodiment of the present disclosure provides an optical element driving mechanism including a fixed portion, a movable element, a plurality of blades, and a driving assembly. The fixed portion has an opening. The movable element is movable relative to the fixed portion. The blades are connected to the movable element. The driving assembly drives the movable element to move relative to the fixed portion. The driving assembly drives the movable element to change the overlap area of the blade and the opening, thereby controlling the amount of incident light, which can be applied to, for example, a variable aperture. The special position and size relationship of each element disclosed in the present invention may enable the optical element drive mechanism to achieve a specific direction of thinning and overall miniaturization. In addition, by applying with different optical modules, the optical element driving mechanism may further improve the optical quality (such as shooting quality or depth sensing accuracy, etc.).

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, having an optical axis, comprising:
   a fixed portion, having an opening;
   a movable element, which is movable relative to the fixed portion;
   a plurality of blades, connected to the movable element;
   a driving assembly, driving the movable element to move relative to the fixed portion; and
   a circuit assembly, comprising:
   a first circuit element, and
   a second circuit element, wherein when viewed along the optical axis, the first circuit element and the second circuit element at least partially overlap, wherein the second circuit element comprises a first external connection portion and a second external connection portion,
   wherein the first external connection portion and the second external connection portion are used to connect an external circuit,
   wherein the first external connection portion has a first metal part,
   wherein the second external connection portion has a second metal part,
   wherein the first metal part has a first opening;
   wherein the second metal part has a second opening;
   wherein the first opening and the second opening open in different directions;
   wherein the movable element is driven by the driving assembly to change an overlapping area of the blades and the opening.

2. The optical element driving mechanism as claimed in claim 1, wherein when viewed along the optical axis, the first external connection portion and the second external connection portion are exposed from the fixed portion.

3. The optical element driving mechanism as claimed in claim 1, wherein when viewed along the optical axis, an angle between a first virtual line and a second virtual line is greater than 60 degrees, wherein the first virtual line connects a center of the first metal part and a center of the opening, and the second virtual line connects a center of the second metal part and the center of the opening.

4. The optical element driving mechanism as claimed in claim 1, wherein the second circuit element further comprises a third external connection portion, and the first external connection portion, the second external connection portion and the third external connection portion respectively extend in an extension direction away from the optical axis, wherein the extension direction of the first external connection portion is parallel to the extension direction of the third external connection portion.

5. The optical element driving mechanism as claimed in claim 1, wherein the second circuit element further comprises a third external connection portion, and the first external connection portion, the second external connection portion and the third external connection portion respectively extend in an extension direction away from the optical axis, wherein the extension direction of the first external connection portion is not parallel to the extension direction of the third external connection portion.

6. The optical element driving mechanism as claimed in claim 4, wherein the second circuit element further comprises a fourth external connection portion, the fourth external connection portion extends in a direction away from the optical axis, and an extension direction of the fourth external connection portion is parallel to the extension direction of the second external connection portion.

7. The optical element driving mechanism as claimed in claim 4, wherein the second circuit element further comprises a fourth external connection portion, the fourth external connection portion extends in a direction away from the optical axis, and an extension direction of the fourth external connection portion is not parallel to the extension direction of the second external connection portion.

8. The optical element driving mechanism as claimed in claim 5, wherein the second circuit element further comprises a fourth external connection portion, the fourth external connection portion extends in a direction away from the optical axis, and an extension direction of the fourth external connection portion is parallel to the extension direction of the second external connection portion.

9. The optical element driving mechanism as claimed in claim 5, wherein the second circuit element further comprises a fourth external connection portion, the fourth external connection portion extends in a direction away from the optical axis, and an extension direction of the fourth external connection portion is not parallel to the extension direction of the second external connection portion.

10. The optical element driving mechanism as claimed in claim 1, wherein the second circuit element further comprises a third external connection portion and a fourth external connection portion, and the first external connection portion, the second external connection portion, the third external connection portion and the fourth external connection portion respectively extend in an extension direction away from the optical axis, the extension direction of the first external connection portion is not parallel to the extension direction of the second external connection portion, and the extension direction of the third external connection portion is not parallel to the extension direction of the fourth external connection portion.

11. The optical element driving mechanism as claimed in claim 10, wherein the extension direction of the first external connection portion is not parallel to the extension direction of the third external connection portion, and the extension direction of the second external connection portion is not parallel to the extension direction of the fourth external connection portion.

12. The optical element driving mechanism as claimed in claim 10, wherein the extension direction of the first external connection portion is parallel to the extension direction of the third external connection portion, and the extension direction of the second external connection portion is parallel to the extension direction of the fourth external connection portion.

13. The optical element driving mechanism as claimed in claim 10, wherein the extension direction of the first external connection portion is parallel to the extension direction of the third external connection portion, and the extension direction of the second external connection portion is not parallel to the extension direction of the fourth external connection portion.

14. The optical element driving mechanism as claimed in claim 10, wherein the extension direction of the first external connection portion is not parallel to the extension direction of the third external connection portion, and the extension direction of the second external connection portion is parallel to the extension direction of the fourth external connection portion.

15. The optical element driving mechanism as claimed in claim 1, wherein the opening receives an incident light, and when viewed along an incident direction of the incident light, a distance between the second circuit element and the opening is smaller than a distance between the first circuit element and the opening.

16. The optical element driving mechanism as claimed in claim 1, wherein the first circuit element and the second circuit element are independent entities, wherein when viewed along a direction that is perpendicular to the optical axis, the first circuit element and the second circuit element are parallel to each other, and the first circuit element and the second circuit element have a space that is not zero.

17. The optical element driving mechanism as claimed in claim 1, further comprises a sensing assembly used to sensing a relative movement of the fixed portion and the movable element, the sensing assembly comprises a sensing element, and the sensing element is disposed on the first circuit element.

18. The optical element driving mechanism as claimed in claim 17, further comprises a guiding assembly and a magnetically permeable element, and the driving assembly comprises a magnetic element, wherein when viewed along the optical axis, the guiding assembly and the magnetic element do not overlap, and the guiding assembly and the magnetically permeable element do not overlap.

19. The optical element driving mechanism as claimed in claim 18, wherein when viewed along the optical axis, the sensing element and the magnetically permeable element do not overlap, and the magnetic element and the sensing element at least partially overlap.

* * * * *